(12) United States Patent
Liu et al.

(10) Patent No.: US 8,894,857 B2
(45) Date of Patent: Nov. 25, 2014

(54) METHODS AND SYSTEMS FOR TREATING WASTEWATER

(75) Inventors: Wenjun Liu, Wayne, PA (US); Edward John Jordan, Lenexa, KS (US); Paul M. Gallagher, Hopkinton, MA (US)

(73) Assignee: Evoqua Water Technologies LLC, Warrendale, PA (US)

( * ) Notice: Subject to any disclaimer, the term of this patent is extended or adjusted under 35 U.S.C. 154(b) by 530 days.

(21) Appl. No.: 13/091,384

(22) Filed: Apr. 21, 2011

(65) Prior Publication Data

US 2011/0259821 A1 Oct. 27, 2011
US 2014/0076799 A9 Mar. 20, 2014

Related U.S. Application Data

(63) Continuation-in-part of application No. 12/934,927, filed as application No. PCT/US2009/001949 on Mar. 27, 2009.

(60) Provisional application No. 61/326,428, filed on Apr. 21, 2010, provisional application No. 61/040,179, filed on Mar. 28, 2008, provisional application No. 61/041,720, filed on Apr. 2, 2008, provisional application No. 61/046,631, filed on Apr. 21, 2008.

(51) Int. Cl.
| | |
|---|---|
| *C02F 3/30* | (2006.01) |
| *C02F 3/00* | (2006.01) |
| *C02F 1/52* | (2006.01) |
| *C02F 3/10* | (2006.01) |
| *C02F 3/12* | (2006.01) |

(52) U.S. Cl.
CPC .............. *C02F 3/302* (2013.01); *C02F 2209/03* (2013.01); *C02F 2209/10* (2013.01);
(Continued)

(58) Field of Classification Search
CPC .... C02F 3/10; C02F 2209/14; C02F 2209/44; C02F 2209/08; C02F 2209/02; C02F 2209/03; C02F 3/1215; C02F 2209/20; C02F 1/5236; C02F 2209/10; C02F 2209/40; C02F 1/5254; C02F 3/006; C02F 3/1263; C02F 2209/16; C02F 3/302; C02F 2209/003
USPC ......... 210/605, 609, 612, 613, 614, 615, 616, 210/617, 621, 622, 623, 903, 906, 195.3, 210/196, 252, 259
See application file for complete search history.

(56) References Cited

U.S. PATENT DOCUMENTS 2,259,688 A 10/1941 Genter
2,359,004 A 9/1944 Schlenz et al.
(Continued)

FOREIGN PATENT DOCUMENTS

CN 1229403 A 9/1999
CN 1884151 A 12/2006
(Continued)

OTHER PUBLICATIONS

Abu-Orf et al., "Chemical and Physical Pretreatment of ATAD Biosolids for Dewatering," Water Science Technology, 2001, vol. 44, No. 10, pp. 309-314, IWA Publishing.
(Continued)

*Primary Examiner* — Fred Prince

(57) ABSTRACT

A method and system of treating wastewater is disclosed. The treatment system has a nitrification-denitrification system comprising a sorption system, a biofilm system, and an anaerobic digester that digests or converts at least a portion of the solids or sludge from the sorption system and biofilm system.

27 Claims, 7 Drawing Sheets

(52) U.S. Cl.
CPC ............ *C02F 3/006* (2013.01); *C02F 2209/02* (2013.01); *C02F 1/5236* (2013.01); *C02F 2303/10* (2013.01); *C02F 2209/08* (2013.01); *C02F 3/1263* (2013.01); *C02F 2209/20* (2013.01); *C02F 2209/14* (2013.01); *C02F 2209/44* (2013.01); *C02F 2209/003* (2013.01); *C02F 2209/40* (2013.01); *C02F 1/5254* (2013.01); *C02F 2209/16* (2013.01); *C02F 3/10* (2013.01); *C02F 3/1215* (2013.01); *Y10S 210/903* (2013.01)
USPC ........... 210/605; 210/614; 210/615; 210/623; 210/903; 210/259

(56) References Cited

U.S. PATENT DOCUMENTS

| | | | |
|---|---|---|---|
| 2,893,957 | A | 7/1959 | Genter et al. |
| 3,047,492 | A | 7/1962 | Gambrel |
| 3,192,155 | A | 6/1965 | Bready et al. |
| 3,259,566 | A | 7/1966 | Torpey |
| 3,544,476 | A | 12/1970 | Aiba et al. |
| 3,595,537 | A | 7/1971 | Kaelin |
| 3,617,540 | A | 11/1971 | Bishop et al. |
| 3,756,946 | A | 9/1973 | Levin et al. |
| 3,774,768 | A | 11/1973 | Turner |
| 3,787,316 | A | 1/1974 | Brink et al. |
| 3,907,672 | A | 9/1975 | Milne |
| 3,964,998 | A | 6/1976 | Barnard |
| 4,042,493 | A | 8/1977 | Matsch et al. |
| 4,056,465 | A | 11/1977 | Spector |
| 4,132,638 | A | 1/1979 | Carlsson |
| 4,141,822 | A | 2/1979 | Levin et al. |
| 4,160,724 | A | 7/1979 | Laughton |
| 4,162,153 | A | 7/1979 | Spector |
| 4,173,531 | A | 11/1979 | Matsch et al. |
| 4,180,459 | A | 12/1979 | Zievers |
| 4,267,038 | A * | 5/1981 | Thompson ............... 210/602 |
| 4,271,026 | A | 6/1981 | Chen et al. |
| 4,277,342 | A | 7/1981 | Hayes et al. |
| 4,279,753 | A | 7/1981 | Nielson et al. |
| 4,284,510 | A | 8/1981 | Savard et al. |
| 4,323,367 | A | 4/1982 | Ghosh |
| 4,351,729 | A | 9/1982 | Witt |
| 4,370,233 | A | 1/1983 | Hayes et al. |
| 4,374,730 | A | 2/1983 | Braha et al. |
| 4,407,717 | A | 10/1983 | Teletzke et al. |
| 4,442,005 | A | 4/1984 | Breider |
| 4,491,522 | A | 1/1985 | Ishida et al. |
| 4,522,722 | A | 6/1985 | Nicholas |
| 4,537,682 | A | 8/1985 | Wong-Chong |
| 4,548,715 | A | 10/1985 | Stein |
| 4,568,457 | A | 2/1986 | Sullivan |
| 4,568,462 | A | 2/1986 | Bohnke et al. |
| 4,599,167 | A | 7/1986 | Benjes et al. |
| 4,632,758 | A | 12/1986 | Whittle |
| 4,643,830 | A | 2/1987 | Reid |
| 4,663,044 | A * | 5/1987 | Goronszy ............... 210/610 |
| 4,664,804 | A | 5/1987 | Morper et al. |
| RE32,429 | E | 6/1987 | Spector |
| 4,675,114 | A | 6/1987 | Zagyvai et al. |
| 4,705,633 | A | 11/1987 | Bogusch |
| 4,710,301 | A | 12/1987 | Geuens |
| 4,731,185 | A | 3/1988 | Chen et al. |
| 4,780,198 | A | 10/1988 | Crawford et al. |
| 4,790,939 | A | 12/1988 | Suzuki et al. |
| 4,797,212 | A | 1/1989 | Von Nordenskjold |
| 4,818,391 | A | 4/1989 | Love |
| 4,842,732 | A | 6/1989 | Tharp |
| 4,849,108 | A | 7/1989 | De Wilde et al. |
| 4,867,883 | A | 9/1989 | Daigger et al. |
| 4,874,519 | A | 10/1989 | Williamson |
| 4,891,136 | A | 1/1990 | Voyt |
| 4,915,840 | A | 4/1990 | Rozich |
| 4,956,094 | A | 9/1990 | Levin et al. |
| 4,961,854 | A | 10/1990 | Wittmann et al. |
| 4,975,197 | A | 12/1990 | Wittmann et al. |
| 4,999,111 | A | 3/1991 | Williamson |
| 5,013,442 | A | 5/1991 | Davis et al. |
| 5,019,266 | A | 5/1991 | Soeder et al. |
| 5,022,993 | A | 6/1991 | Williamson |
| 5,051,191 | A | 9/1991 | Rasmussen et al. |
| 5,068,036 | A | 11/1991 | Li et al. |
| 5,094,752 | A | 3/1992 | Davis et al. |
| 5,098,567 | A | 3/1992 | Nishiguchi |
| 5,098,572 | A | 3/1992 | Faup et al. |
| 5,114,587 | A | 5/1992 | Hagerstedt |
| 5,126,049 | A | 6/1992 | Hallberg |
| 5,128,040 | A | 7/1992 | Molof et al. |
| 5,137,636 | A | 8/1992 | Bundgaard |
| 5,151,187 | A | 9/1992 | Behmann |
| 5,182,021 | A | 1/1993 | Spector |
| 5,213,681 | A | 5/1993 | Kos |
| 5,234,595 | A | 8/1993 | DiGregorio et al. |
| 5,246,585 | A | 9/1993 | Meiring |
| 5,248,422 | A * | 9/1993 | Neu ............... 210/605 |
| 5,254,253 | A | 10/1993 | Behmann |
| 5,282,980 | A | 2/1994 | Kew et al. |
| 5,288,405 | A | 2/1994 | Lamb, III |
| 5,288,406 | A | 2/1994 | Stein |
| 5,304,308 | A | 4/1994 | Tsumura et al. |
| 5,316,682 | A | 5/1994 | Keyser et al. |
| 5,336,290 | A | 8/1994 | Jermstad |
| 5,342,522 | A | 8/1994 | Marsman et al. |
| 5,348,653 | A | 9/1994 | Rovel |
| 5,348,655 | A | 9/1994 | Simas et al. |
| 5,356,537 | A | 10/1994 | Thurmond et al. |
| 5,376,242 | A | 12/1994 | Hayakawa |
| 5,380,438 | A | 1/1995 | Nungesser |
| 5,389,258 | A | 2/1995 | Smis et al. |
| 5,480,548 | A | 1/1996 | Daigger et al. |
| 5,482,630 | A | 1/1996 | Lee et al. |
| 5,505,862 | A | 4/1996 | Sonnenrein |
| 5,514,277 | A | 5/1996 | Khudenko |
| 5,514,278 | A | 5/1996 | Khudenko |
| 5,531,896 | A | 7/1996 | Tambo et al. |
| 5,543,051 | A | 8/1996 | Harris |
| 5,543,063 | A | 8/1996 | Walker et al. |
| 5,578,202 | A * | 11/1996 | Hirane ............... 210/150 |
| 5,582,734 | A | 12/1996 | Coleman et al. |
| 5,601,719 | A | 2/1997 | Hawkins et al. |
| 5,611,927 | A | 3/1997 | Schmid |
| 5,616,241 | A | 4/1997 | Khudenko |
| 5,624,562 | A | 4/1997 | Scroggins |
| 5,624,565 | A | 4/1997 | Lefevre et al. |
| 5,626,755 | A | 5/1997 | Keyser et al. |
| 5,650,069 | A | 7/1997 | Hong et al. |
| 5,651,891 | A | 7/1997 | Molof et al. |
| 5,658,458 | A | 8/1997 | Keyser et al. |
| 5,725,772 | A | 3/1998 | Shirodkar |
| 5,733,455 | A | 3/1998 | Molof et al. |
| 5,733,456 | A | 3/1998 | Okey et al. |
| 5,746,919 | A | 5/1998 | Dague et al. |
| 5,750,041 | A | 5/1998 | Hirane |
| 5,773,526 | A | 6/1998 | Van Dijk et al. |
| 5,783,081 | A | 7/1998 | Gaddy |
| 5,811,008 | A | 9/1998 | Von Nordenskjold |
| 5,824,222 | A | 10/1998 | Keyser et al. |
| 5,833,856 | A | 11/1998 | Liu et al. |
| 5,846,424 | A | 12/1998 | Khudenko |
| 5,853,588 | A | 12/1998 | Molof et al. |
| 5,858,222 | A | 1/1999 | Shibata et al. |
| 5,868,934 | A | 2/1999 | Yamasaki et al. |
| 5,919,367 | A | 7/1999 | Khudenko |
| 5,989,428 | A | 11/1999 | Goronszy |
| 5,993,503 | A | 11/1999 | Kruidhof |
| 6,004,463 | A | 12/1999 | Swett |
| 6,015,496 | A | 1/2000 | Khudenko |
| 6,036,862 | A | 3/2000 | Stover |
| 6,039,874 | A | 3/2000 | Teran et al. |
| 6,047,768 | A | 4/2000 | Buehler, III |
| 6,054,044 | A | 4/2000 | Hoffland et al. |
| 6,066,256 | A | 5/2000 | Henry et al. |
| 6,077,430 | A | 6/2000 | Chudoba et al. |

(56) References Cited

U.S. PATENT DOCUMENTS

| | | |
|---|---|---|
| 6,093,322 A | 7/2000 | Bongards |
| 6,110,389 A | 8/2000 | Horowitz |
| 6,113,788 A | 9/2000 | Molof et al. |
| 6,117,323 A | 9/2000 | Haggerty |
| 6,193,889 B1 | 2/2001 | Teran et al. |
| 6,217,768 B1 | 4/2001 | Hansen et al. |
| 6,352,643 B1 | 3/2002 | Kwon et al. |
| 6,383,387 B2 | 5/2002 | Hasegawa et al. |
| 6,383,389 B1 | 5/2002 | Pilgram et al. |
| 6,416,668 B1 | 7/2002 | Al-Samadi |
| 6,423,229 B1 | 7/2002 | Mao |
| 6,454,949 B1 | 9/2002 | Sesay et al. |
| 6,527,956 B1 | 3/2003 | Lefevre et al. |
| 6,555,002 B2 | 4/2003 | Garcia et al. |
| 6,562,237 B1 | 5/2003 | Olaopa |
| 6,585,895 B2 | 7/2003 | Smith et al. |
| 6,592,762 B2 | 7/2003 | Smith |
| 6,605,220 B2 | 8/2003 | Garcia et al. |
| 6,630,067 B2 | 10/2003 | Shieh et al. |
| 6,660,163 B2 | 12/2003 | Miklos |
| 6,666,965 B1 | 12/2003 | Timmons |
| 6,706,185 B2 | 3/2004 | Goel et al. |
| 6,712,970 B1 | 3/2004 | Trivedi |
| 6,783,679 B1 | 8/2004 | Rozich |
| 6,787,035 B2 | 9/2004 | Wang |
| 6,805,806 B2 | 10/2004 | Arnaud |
| 6,814,868 B2 | 11/2004 | Phagoo et al. |
| 6,833,074 B2 | 12/2004 | Miklos |
| 6,852,225 B1 | 2/2005 | Oswald et al. |
| 6,863,818 B2 | 3/2005 | Daigger et al. |
| 6,884,355 B2 | 4/2005 | Kamiya et al. |
| 6,893,567 B1 | 5/2005 | Vanotti et al. |
| 7,105,091 B2 | 9/2006 | Miklos |
| 7,147,778 B1 | 12/2006 | DiMassimo et al. |
| 7,156,998 B2 | 1/2007 | Reid |
| 7,208,090 B2 | 4/2007 | Applegate et al. |
| 7,258,791 B2 | 8/2007 | Matsumoto |
| 7,309,427 B2 | 12/2007 | Kruse et al. |
| 7,314,564 B2 | 1/2008 | Kruse et al. |
| 7,413,654 B2 | 8/2008 | Applegate et al. |
| 7,473,364 B2 | 1/2009 | Abu-Orf |
| 7,556,737 B2 | 7/2009 | Zhang |
| 7,569,147 B2 | 8/2009 | Curtis et al. |
| 2001/0045390 A1 | 11/2001 | Kim et al. |
| 2002/0030003 A1 | 3/2002 | O'Leary et al. |
| 2002/0050283 A1 | 5/2002 | Bergmann |
| 2002/0185434 A1 | 12/2002 | Mao |
| 2002/0185435 A1* | 12/2002 | Husain et al. ............... 210/605 |
| 2002/0192809 A1 | 12/2002 | Lanting et al. |
| 2004/0004038 A1 | 1/2004 | Yamaguchi et al. |
| 2004/0016698 A1 | 1/2004 | Unger |
| 2004/0206699 A1 | 10/2004 | Ho et al. |
| 2004/0232076 A1 | 11/2004 | Zha et al. |
| 2005/0035059 A1 | 2/2005 | Zhang et al. |
| 2005/0040103 A1 | 2/2005 | Abu-Orf et al. |
| 2005/0045557 A1 | 3/2005 | Daigger et al. |
| 2005/0061737 A1 | 3/2005 | Linden et al. |
| 2005/0194310 A1 | 9/2005 | Yamamoto et al. |
| 2006/0113243 A1 | 6/2006 | Applegate et al. |
| 2006/0124543 A1 | 6/2006 | Pehrson et al. |
| 2006/0249448 A1 | 11/2006 | Fujishima et al. |
| 2006/0249449 A1 | 11/2006 | Nakhla et al. |
| 2007/0000836 A1 | 1/2007 | Elefritz et al. |
| 2007/0045181 A1 | 3/2007 | Brase |
| 2007/0051677 A1 | 3/2007 | Curtis et al. |
| 2007/0193949 A1 | 8/2007 | You et al. |
| 2007/0235386 A1 | 10/2007 | Barnes |
| 2008/0041783 A1 | 2/2008 | Barnes |
| 2008/0223783 A1 | 9/2008 | Sutton |
| 2009/0014387 A1 | 1/2009 | Probst |
| 2009/0078646 A1 | 3/2009 | Curtis et al. |
| 2011/0089105 A1 | 4/2011 | Liu et al. |
| 2011/0132836 A1 | 6/2011 | Olson |

FOREIGN PATENT DOCUMENTS

| | | |
|---|---|---|
| CN | 1894167 A | 1/2007 |
| DE | 4238708 | 5/1994 |
| DE | 4444335 | 6/1996 |
| EP | 0106043 | 4/1984 |
| EP | 0408878 | 1/1991 |
| EP | 0440996 | 8/1991 |
| EP | 0497114 | 8/1992 |
| EP | 1236686 | 9/2002 |
| FR | 2674844 | 10/1992 |
| FR | 2766813 B1 | 10/1999 |
| FR | 2843106 B1 | 10/2004 |
| GB | 1438697 A | 6/1976 |
| GB | 1441241 A | 6/1976 |
| GB | 2006743 | 5/1979 |
| JP | 5687496 | 6/1981 |
| JP | 59032999 | 2/1984 |
| JP | 59052597 | 3/1984 |
| JP | 60-84199 | 5/1985 |
| JP | 61192389 | 8/1986 |
| JP | 63130197 | 6/1988 |
| JP | 62138986 | 12/1988 |
| JP | 63302996 | 12/1988 |
| JP | 01174949 | 2/1991 |
| JP | 3042019 | 2/1991 |
| JP | 466195 | 3/1992 |
| JP | 6091285 | 4/1994 |
| JP | 07-16589 | 1/1995 |
| JP | 2659167 B2 | 9/1997 |
| JP | 09262599 | 10/1997 |
| JP | 2000-199086 | 7/2000 |
| JP | 2000210542 | 8/2000 |
| JP | 2001347296 A | 12/2001 |
| JP | 2002035779 A | 2/2002 |
| JP | 2003033780 A | 2/2003 |
| JP | 2006082024 A | 3/2006 |
| NL | 9301791 | 10/1993 |
| RU | 1596752 | 9/1995 |
| WO | 9315026 | 8/1993 |
| WO | 9424055 | 10/1994 |
| WO | 9801397 A1 | 1/1998 |
| WO | 03039712 | 5/2003 |
| WO | 03041837 | 5/2003 |
| WO | 03072512 | 9/2003 |
| WO | 2004076026 | 9/2004 |
| WO | 2009/086584 | 7/2009 |
| WO | 2009086584 | 7/2009 |
| WO | 2009120384 | 10/2009 |

OTHER PUBLICATIONS

Abu-Orf et al., "Adjusting Floc Cations to Improve Effluent Quality: The Case of Aluminum Addition at Sioux City Wastewater Treatment Facility," Water Environment Federation, 2004, 16 pages.

Bakker, Chapter IIA, "Cell K+ and K+ Transport Systems in Prokaryotes," In Alkali Cation Transport Systems in Prokaryotes, Bakker, E.P., 1993, pp. 205-224, CRC Press.

Bishop et al., "Fate of Nutrients during Aerobic Digestion," Journal Environ. Eng. Div. Proc. Am. Soc. Civil Eng., 1978, vol. 104, No. EE5, pp. 967-979.

Bruus et al., "On the Stability of Activated Sludge Flocs with Implications to Dewatering," Water Research, 1992, vol. 26, No. 12, pp. 1597-1604, Pergamon Press Ltd.

Caulet et al., "Modulated Aeration Management by Combined ORP and DO Control: A Guarantee of Quality and Power Savings for Carbon and Nitrogen Removal in Full Scale Wastewater Treatment Plants," Center of International Research for Water Environment, France, 1999.

Chudoba et al., "Pre-Denitrification Performance of a High-Loaded Anoxic Sludge," Degremont Research Center, France, 1999.

Charpentier et al., ORP Regulation and Activated Sludge, 15 years of Experience, 19th Biennial Conference/AWQ of Vancouver—Jun. 1998.

Chen et al., "Minimization of activated sludge production by chemically stimulated energy spilling," Water Science and Technology, 2000, pp. 189-200, vol. 42, No. 12, IWA Publishing.

(56) References Cited

OTHER PUBLICATIONS

Chen et al., "Effect of Sludge Fasting/Feasting on Growth of Activated Sludge Cultures," Wat. Res., 2001, pp. 1029-1037, vol. 35, No. 4, Elsevier Science Ltd., Pergamon.

Chudoba et al., "The Aspect of Energetic Uncoupling of Microbial Growth in the Activated Sludge Process—OSA System," Water Science and Technology, 1992, pp. 2477-2480, vol. 26, No. 9-11, IAWPRC.

"Contrashear filter solutions for waste water," for Contra ShearTM, Jul. 29, 2005, p. 1 of 1, http://www.contrashear.co.nz/.

Dignac et al., "Chemical Description of Extracellular Polymers" Implication on Activated Sludge Floc Structure, Water Science Technology, 1998, vol. 38, No. 8-9, pp. 45-53, Elsevier Science Ltd.

DuBois et al., "Colorimetric Method for Determination of Sugars and Related Substances," Analytical Chemistry, 1956, vol. 28, No. 3, pp. 350-356.

"Efficient treatment of high strength industrial and municipal wastewater" brochure by Envirex Inc., Jan. 1990.

Ekama et al., "Considerations in the Process Design of Nutrient Removal Activated Sludge Processes," Water Science and Technology, 1983, pp. 283-318, vol. 15, IAWPRC/Pergamon Press Ltd.

Frolund et al., "Extraction of Extracellular Polymers from Activated Sludge Using a Cation Exchange Resin," Water Research, 1996, vol. 30, No. 8, pp. 1749-1758, Elsevier Science Ltd.

"GAC Fluid Bed Efficient, economical bioremediation of BTEX groundwater" brochure by Envirex Inc., Dec. 1992.

Hartree, "Determination of Protein: A Modification of the Lowry Method that Gives a Linear Photometric Response," Analytical Biochemistry, 1972, vol. 48, pp. 422-427, Academic Press, Inc.

Harrison et al., "Transient Responses of Facultatively Anaerobic Bacteria Growing in Chemostat Culture to a Change from Anaerobic to Aerobic Conditions," Journal of General Microbiology, 1971, pp. 45-52, vol. 68.

Higgins et al., "Characterization of Exocellular Protein and Its Role in Bioflocculation," Journal of Environmental Engineering, 1997, vol. 123, pp. 479-485.

Higgins et al., "The Effect of Cations on the Settling and Dewatering of Activated Sludges: Laboratory Results," Water Environment Research, 1997, vol. 69, No. 2, pp. 215-224.

Holbrook et al., "A Comparison of Membrane Bioreactor and Conventional-Activated-Sludge Mixed Liquor and Biosolids Characteristics," Water Environment Research, 2005, vol. 77, No. 4, pp. 323-330.

Hong et al., "Biological Phosphorus and Nitrogen Removal Via the A/O Process: Recent Experience in the United States and United Kingdom," Water Science and Technology, 1984, pp. 151-172, vol. 16, Vienna, Austria.

"Internally-fed Rotary Wedgewire Screens" brochure by Parkson Corporation for Hycor® Rotoshear® (year not provided).

Kakii et al., "Effect of Calcium Ion on Sludge Characteristics," J. Ferment. Technol., 1985, vol. 63, No. 3, pp. 263-270.

Kim et al., pH and Oxidation-Reduction Potential Control Strategy for Optimization of Nitrogen Removal in an Alternating Aerobic-Anoxic System, Water Environment Research, vol. 73, No. 1, 2001.

Klopping et al., "Activated Sludge Microbiology, Filamentous and Non-Filamentous Microbiological Problems and Biological Nutrient Removal," Water Environment Federation, Plant Operations Specialty Conference, Date Unknown.

Low et al., "The Use of Chemical Uncouplers for Reducing Biomass Production During Biodegradation," Water Science and Technology, 1998, pp. 399-402, vol. 37, No. 4-5, Elsevier Science Ltd./Pergamon.

Lowry et al., "Protein Measurement with the Folin Phenol Reagent," J. Bio. Chem., 1951, vol. 193, pp. 265-275.

Mahmoud et al., "Anaerobic Stabilisation and Conversion of Biopolymers in Primary Sludge-Effect of Temperature and Sludge Retention Time," Water Research, 2004, vol. 38, pp. 983-991, Elsevier Ltd.

Moen et al., "Effect of Solids Retention Time on the Performance of Thermophilic and Mesophilic Digestion of Combined Municipal Wastewater Sludges," Water Environment Research, 2003, vol. 75, No. 6, pp. 539-548.

Murthy et al., "Factors Affecting Floc Properties During Aerobic Digestion: Implications for Dewatering," Water Environment Research, 1999, vol. 71, No. 2, pp. 197-202.

Murthy et al., "Optimizing Dewatering of Biosolids from Autothermal Thermophilic Aerobic Digesters (ATAD) Using Inorganic Conditioners," Water Environment Research, 2000, vol. 72, No. 6, pp. 714-721.

Nielsen et al., "Changes in the Composition of Extracellular Polymeric Substances in Activated Sludge During Anaerobic Storage," Appl. Microbiol. Biotechnol., 1996, vol. 44, pp. 823-830, Springer-Verlag.

Novak et al., "Mechanisms of Floc Destruction During Anaerobic and Aerobic Digestion and the Effect on Conditioning and Dewatering of Biosolids," Water Research, 2003, vol. 37, pp. 3136-3144, Elsevier Science Ltd.

Park et al., "The Digestibility of Waste Activated Sludges," Water Environment Research, 2006, vol. 78, No. 1, pp. 59-68.

Park et al., "The Effect of Wastewater Cations on Activated Sludge Characteristics: Effects of Aluminum and Iron in Floc," Water Environment Research, 2006, vol. 78, No. 1, pp. 31-40.

Euro-Matic, "Hollow Plastic Balls for Industrial Applications," Sep. 10, 2004, (7 pages), http://www.euro-matic.com/hollow.html.

Van Loosdrecht et al., "Maintenance, Endogeneous Respiration, Lysis, Decay and Predation," Water Science and Technology, 1999, pp. 107-117, vol. 39, No. 1, IAWQ/Elsevier Science Ltd../Pergamon.

Ra et al., "Biological Nutrient Removal with an Internal Organic Carbon Source in Piggery Wastewater Treatment," Water Research, vol. 34, No. 3, pp. 965-973, 2000.

Rasmussen et al., "Iron Reduction in Activated Sludge Measured with Different Extraction Techniques," Water Research, 1996, vol. 30, No. 3, pp. 551-558, Elsevier Science Ltd.

"Rex VLR/SCC System" brochure by Envirex Inc., Bulletin No. 315-156, Oct. 1989.

"The RotoscreenTM Escalating Fine Channel Screen Builds Pre-Coat to Provide High Solids Capture Rates with the Lowest Headloss," Jul. 29, 2005, p. 1 of 2-page screen, Parkson Corporation Web Home Page, http://www.parkson.com/Content.aspx?ntopicid=120&parent=process&processID=148.

"The Rotoshear® Internalling Fed Rotating Drum Screen's Wedgewire Construction Maximizes Capture for Efficient Screening with Minimal Operator Attention," Jul. 29, 2005, p. 1 of 2-page screen, Parkson Corporation Web Home Page, http://www.parkson.com/Content.aspx?ntopicid=133&parent=municipal&processID=149.

Strand et al., "Activated-Sludge Yield Reduction Using Chemical Uncouplers," Water Environment Research, 1999, pp. 454-458, vol. 71, No. 4.

USFilter, "Aerator Products Aqua-Lator DDM Direct Drive Mixers," 2001, pp. 4.

USFilter, "Aerator Products Aqua-Lator High Speed Surface Aerators," 1999, pp. 2-15.

Urbain et al., "Bioflocculation in Activated Sludge: An Analytic Approach," Water Research, 1993, vol. 27, No. 5, pp. 829-838, Pergamon Press Ltd.

U.S. Environmental Protection Agency, "Acid Digestion of Sediments, Sludges, and Soils," U.S. EPA Method 3050B, 1996, pp. 1-12.

"Vertical loop reactors—fine bubble power efficiency without fine bubble maintenance" brochure by Envirex Inc., Jan. 1986.

Westgarth, et al., "Anaerobiosis in the Activated-Sludge Process," (paper presentation and formal discussions) Department of Environmental Sciences and Engineering, School of Public Health, University of North Carolina, Chapel Hill, pp. 43-61 (neither publication information nor year provided).

(56) References Cited

OTHER PUBLICATIONS

Yasui et al., "An Innovative Approach to Reduce Excess Sludge Production in the Activated Sludge Process," Water Science and Technology, 1995, pp. 11-20, vol. 30, No. 9, IAWQ/Pergamon.

Yasui et al., "A Full-Scale Operation of a Novel Activated Sludge Process Without Excess Sludge Production," Water Science and Technology, 1996, pp. 395-404, vol. 34, No. 3-4, Elsevier Science Ltd., Pergamon.

Mavinic et al., "Fate of Nitrogen in Aerobic Sludge Digestion," J. Water Pollut. Control Fed., 1982, vol. 54, No. 4, pp. 352-360.

Marais et al., "Observations Supporting Phosphate Removal by Biological Excess Uptake-A Review," Water Science and Technology, 1983, pp. 15-41, vol. 15, IAWPRC/Pergamon Press Ltd.

Ng, How, et al., "Membrane bioreactor operation at short solids retention times: performance and biomass characteristics," Water Research 39 (2005), pp. 981-992.

* cited by examiner

METHODS AND SYSTEMS FOR TREATING WASTEWATER

CROSS-REFERENCE TO RELATED APPLICATIONS

This application claims the benefit of U.S. Provisional Application No. 61/326,428, filed Apr. 21, 2010, titled BIOSORPTION PROCESS which is incorporated herein by reference for all purposes.

BACKGROUND OF THE INVENTION

1. Field of the Invention

The present invention relates to systems and processes of wastewater treatment and, in particular, to systems and methods of treating wastewater utilizing biological sorption, biofilms, anoxic treatment, aerobic treatment, and anaerobic sludge digestion.

2. Description of the Related Art

Pilgram et al., in U.S. Pat. No. 6,383,389, which is incorporated herein by reference for all purposes, including but not limited to sequences or stages that can be used in batch or continuous reactors, teach a wastewater treatment system and method of controlling the treatment system. A control system can sequence and supervise treatment steps in a batch flow mode of operation or a continuous flow mode.

Sutton, in U.S. Patent Application No. 2008/0223783, teaches a wastewater treatment system and a method of treating wastewater. The system includes an aerobic membrane bioreactor and an anaerobic digester system connected to receive wasted solids continuously from the aerobic membrane bioreactor. The system also returns effluent from the anaerobic digester system continuously to the aerobic membrane bioreactor.

SUMMARY OF THE INVENTION

One or more aspects of the present disclosure involve embodiments directed to a method for treating wastewater. The method can comprise providing a wastewater to be treated and denitrifying the wastewater in a first biological reactor to produce a denitrified mixed liquor. The method can also comprise nitrifying the denitrified mixed liquor with a nitrifying biofilm on a carrier and biosorbing undesirable constituents from the denitrified mixed liquor with a suspended biomass in a second biological reactor. The method can also comprise separating a first portion of the nitrified mixed liquor in a separator to produce a solids-rich sludge and a treated effluent having a total nitrogen concentration of less than about 10 milligrams of elemental nitrogen per liter, and combining a second portion of the nitrified mixed liquor with the wastewater to be treated.

One or more further aspects of the present disclosure are directed to a wastewater treatment system. The wastewater treatment system can comprise a source of a wastewater to be treated and a first biological reactor having an inlet fluidly connected downstream from the source of the wastewater. The wastewater treatment system can also comprise a biological sorption tank comprising a biofilm carrier, and having an inlet fluidly connected to the first biological reactor, the biological sorption tank constructed and arranged to maintain an effluent having a total nitrogen concentration of less than about 10 milligrams elemental nitrogen per liter and a hydraulic retention time of less than about three hours. The wastewater treatment system can also comprise a separator having a sludge outlet, an effluent outlet, and an inlet fluidly connected downstream of the biological sorption tank, and a sludge recycle line fluidly connecting an outlet of the separator to the source of wastewater.

One or more further aspects of the present disclosure are directed to a method of facilitating wastewater treatment in a wastewater treatment system for reducing a concentration of a nitrogen containing compound from a wastewater. The system has a source of wastewater, an anoxic reactor, an aerobic reactor, a mixed liquor recycle stream fluidly connecting an outlet of the aerobic reactor to the anoxic reactor, a separator, and a sludge recycle stream fluidly connecting an outlet of the separator to the anoxic reactor. The method of facilitating can comprise introducing a biofilm carrier into the aerobic reactor, and fluidly connecting a solids-rich outlet of the separator to an anaerobic digester.

One or more further aspects of the present disclosure are directed to a method for treating wastewater. The method for treating wastewater can comprise providing a wastewater to be treated, and promoting denitrification of the wastewater in a first biological reactor to produce a first biologically treated mixed liquor. The method for treating wastewater can also comprise promoting biological sorption of the first biologically treated mixed liquor and biofilm growth in the second biological reactor. The method for treating wastewater can also comprise separating an effluent of the second biological reactor to produce a solids-rich sludge and a treated effluent having a total nitrogen concentration of less than about 10 milligrams of elemental nitrogen per liter, and treating the solids-rich sludge in a third biological reactor to produce a biologically treated sludge.

BRIEF DESCRIPTION OF THE DRAWINGS

The accompanying drawings are not intended to be drawn to scale. The identical or nearly identical component or feature that is illustrated in various figures is represented by a like numeral. For purposes of clarity, not every component may be labeled in every drawing, nor is every component of each embodiment of the invention shown where illustration is not necessary to allow those of ordinary skill in the art to understand the invention. In the drawings.

DETAILED DESCRIPTION OF THE INVENTION

Figure 1:
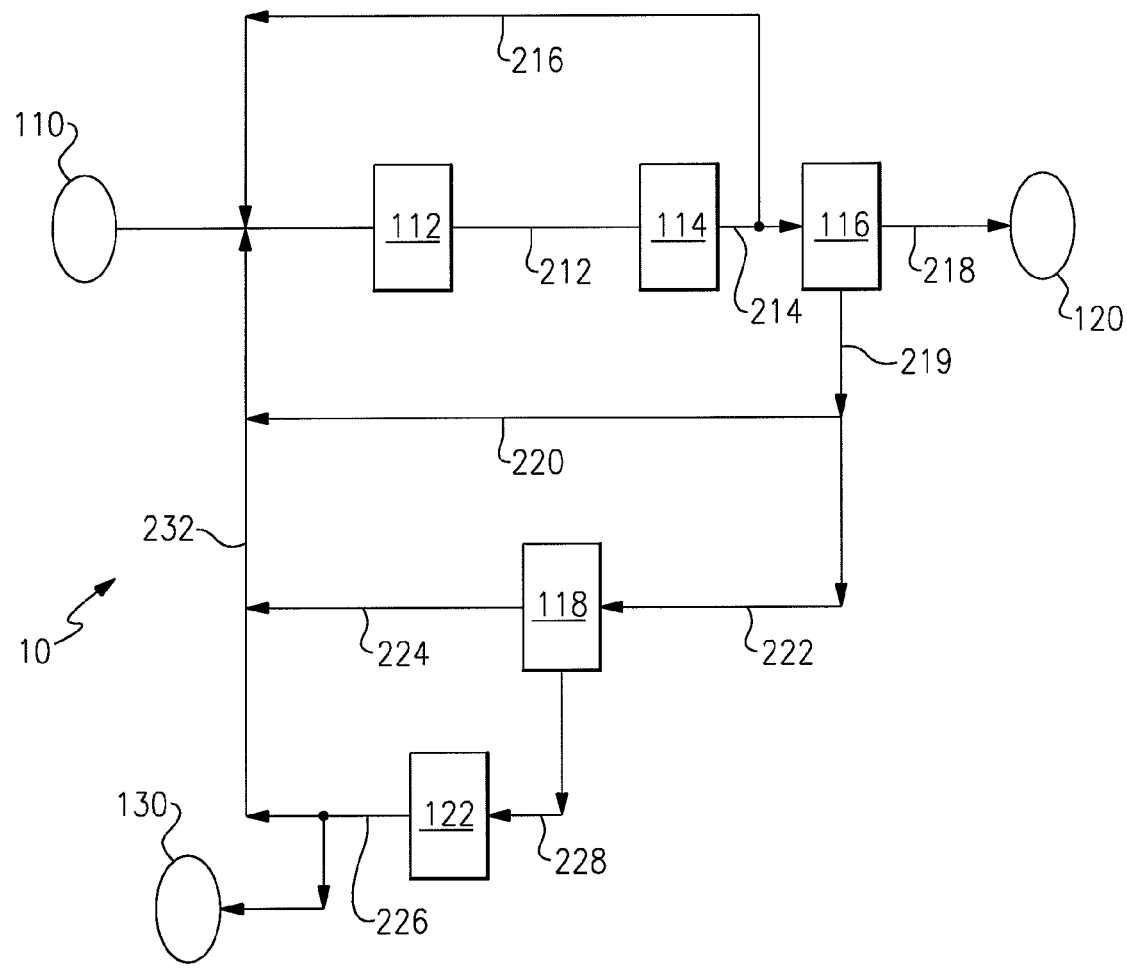
FIG. 1 is a flow diagram illustrating a representative treatment system pertinent to one or more aspects of the invention.

Aspects and embodiments of this invention are directed to systems and methods of treating water, wastewater, or sludge to, for example, reduce oxygen demand, such as the biological oxygen demand (BOD), and render the water suitable for secondary uses or discharge to the environment. Further aspects of the invention can pertain to reducing the content of nitrogen containing compounds, for example ammonia from wastewater. One or more aspects of the invention relate to wastewater treatment systems and methods of operation and facilitating thereof.

The invention is not limited in its application to the details of construction and the arrangement of components, systems, or subsystems set forth herein, and is capable of being practiced or of being carried out in various ways. Typically, the water to be treated, such as wastewater or a wastewater stream, contains waste matter which, in some cases, can comprise solids and soluble and insoluble organic and inorganic material. Prior to discharge to the environment, such streams may require treatment to decontaminate or at least partially render the wastewater streams benign or at least satisfactory for discharge under established regulatory requirements or guidelines. For example, the water can be treated to reduce its chemical oxygen demand (COD), BOD, nitrogen content, and/or other characteristic such as *Giardia* content to within acceptable limits.

Some aspects of the invention can involve biologically treating wastewater by promoting bacterial digestion of biodegradable material of at least a portion of at least one species in the wastewater. Further aspects of the invention can relate to effecting or at least facilitating separation of converted, digested biodegraded solid material from the entraining liquid. Still further aspects of the invention can relate to effecting or at least facilitating reducing an amount of solids from the wastewater or water to be treated.

Some aspects of the invention can involve removing, converting, and/or recovering one or more desired minerals or compounds, for example, nitrogen and/or phosphorous containing compounds, from the wastewater.

As used herein, the terms "water," "wastewater," and "wastewater stream" can refer to water to be treated such as streams or bodies of water from residential, commercial, or municipal, industrial, and agricultural sources, as well as mixtures thereof, that typically contain at least one undesirable species, or pollutant, comprised of biodegradable, inorganic or organic, materials which can be decomposed or converted by biological processes into environmentally benign or at least less objectionable compounds. The water to be treated can also contain biological solids, inert materials, organic compounds, including recalcitrant or a class of compounds that are difficult to biodegrade relative to other organic compounds as well as constituents from ancillary treatment operations such as, but not limited to nitrosamines and endocrine disruptors.

A "solids-lean" or "sludge-lean" sludge, portion, stream, or fluid is typically a liquid, such as water that has been at least partially treated, having less suspended solids relative to a starting mixed liquor or sludge after one or more settling or separation operations. Conversely, a "solids-rich" or "sludge-rich" sludge, portion, stream, or fluid is typically a liquid, such as water that has been at least partially treated, having a higher solids concentration relative to the starting mixed liquor or sludge after one or more settling or separation operations. For example, a mixed liquor having suspended solids can be allowed to promote settling of at least a portion of the solids suspended therein; the resultant water body, as a consequence of artificially induced or natural gravitational forces will typically have a lower water layer and an upper water layer, wherein the lower layer has a higher concentration of solids, relative to the starting mixed liquor and to the upper, solids-lean water layer. Further, the solids-lean water layer will typically have a lower concentration of solids suspended therein relative to the starting mixed liquor. Separation operations that can be utilized to effect or promote some aspects of the invention can utilize gravitational forces to produce any of the solids-rich, solids-lean, sludge-rich, and sludge-lean portions or streams. Other separation operations can involve filtration.

A "treated" portion is typically water having less undesirable species or pollutants relative to a starting "solids-lean" portion after one or more treatment stages, such as one or more biological or separation operations. A "solids-lean" portion having undesirable species such as soluble inorganic or organic compounds can be introduced to one or more separation operations, such as a membrane filtration device or a membrane bioreactor that may retain the inorganic or organic compounds on a first side of a filter as a "second mixed liquor," while allowing the "treated" portion to pass through the filter.

In certain embodiments, the treated portion may have a characteristic or property related to the concentration of particular components therein. For example, the treated portion can have a concentration of nitrogen containing components or BOD or COD content that is below a certain value. In certain examples, the treated product or effluent may have an ammonia concentration of less than about five milligrams of elemental nitrogen per liter. The treated product or effluent may have a COD concentration of less than about 80 milligrams per liter.

One or more of the inventive systems disclosed herein can comprise one or more biologically-based or non-biologically-based unit operations. The systems and techniques of the invention can be effected as, or at least as a portion, of decontamination or treatment systems that typically include one or more of pre-treatment, primary treatment, secondary treatment, and post-treatment or polishing operations. The treatment facilities that can employ one or more aspects of the invention can include at least one of the pre-treatment, primary treatment, secondary treatment, and post-treatment or polishing operations.

Pretreatment systems and operations may remove grit, sand, and gravel. Primary treatment operations or systems can involve at least partial equalization, neutralization, and/or removal of large insoluble material of the water to be treated such as, but not limited to fats, oils, and grease. The pretreatment and primary treatment operations may be combined to remove such materials as well as settleable solids and floating bodies, and insoluble objects such as rags and sticks. For example, primary clarifiers may be utilized to separate solids.

Secondary treatment unit operations or systems can involve biological treatment such as those that typically employ a biomass with bacteria or a consortium of microorganisms to at least partially hydrolyze or convert biodegradable material such as, but not limited to sugar, fat, organic molecules, and compounds that create an oxygen demand in the water. Indeed, some advantageous aspects of the invention can utilize biological processes and systems to remove or convert at least a portion of organic material in the water to be treated.

Post-treatment or polishing operations or systems can include biological treatments, chemical treatments, and separation systems. The post-treatment operations may include processes that involve biological nitrification/denitrification and/or phosphorus removal. Chemical treatments that can be used may include chemical oxidation and chemical precipitation. Separation systems can include dissolved inorganic solids removal by ion exchange, ultrafiltration, reverse osmosis, or electrodialysis. Further treatment processes can involve disinfection, decontamination or inactivation of at least a portion of any residual microorganisms by chemical or physical means. For example, disinfection can be effected by exposure to any one or more of oxidizing agents or to actinic radiation. Commercially available separation systems that may be utilized in some embodiments of the invention include those employing the CMF-S™ continuous membrane filtration modules as well as the MEMCOR® CMF (Pressurized) XP, CP, and XS membrane filtration systems, from Siemens Industry Inc. Other separators that can be used include filter presses and centrifuges.

Some embodiments of the treatment systems of the invention can comprise a source of a wastewater to be treated and a first biological reactor having an inlet fluidly connected downstream from the source of the wastewater. The wastewater treatment system can also comprise a biological sorption tank comprising a biofilm carrier, and having an inlet fluidly connected to the first biological reactor, the biological sorption tank constructed and arranged to maintain an effluent having a total nitrogen concentration of less than about 10 milligrams elemental nitrogen per liter and a hydraulic retention time of less than about three hours. The wastewater treatment system can further comprise a separator having a sludge outlet, an effluent outlet, and an inlet fluidly connected downstream of the biological sorption tank, and a sludge recycle line fluidly connecting an outlet of the separator to the source of wastewater.

Some embodiments of the methods for treating wastewater can comprise providing a wastewater to be treated and denitrifying the wastewater in a first biological reactor to produce a denitrified mixed liquor. The method can also comprise nitrifying the denitrified mixed liquor with a nitrifying biofilm on a carrier and biosorbing undesirable constituents from the denitrified mixed liquor with a suspended biomass in a second biological reactor. The method can further comprise separating a first portion of the nitrified mixed liquor in a separator to produce a solids-rich sludge and a treated effluent having a total nitrogen concentration of less than about 10 milligrams of elemental nitrogen per liter, and combining a second portion of the nitrified mixed liquor with the wastewater to be treated.

Other embodiments of the methods for treating wastewater can comprise providing a wastewater to be treated, and promoting denitrification of the wastewater in a first biological reactor to produce a first biologically treated mixed liquor. The method for treating wastewater can also comprise promoting biological sorption of the first biologically treated mixed liquor and biofilm growth in the second biological reactor. The method for treating wastewater can further comprise separating an effluent of the second biological reactor to produce a solids-rich sludge and a treated effluent having a total nitrogen concentration of less than about 10 milligrams of elemental nitrogen per liter, and treating the solids-rich sludge in a third biological reactor to produce a biologically treated sludge.

One or more further embodiments are directed to a method of facilitating wastewater treatment in a wastewater treatment system for reducing a concentration of a nitrogen containing compound from a wastewater. The system has a source of wastewater, an anoxic reactor, an aerobic reactor, a mixed liquor recycle stream fluidly connecting an outlet of the aerobic reactor to the anoxic reactor, a separator, and a sludge recycle stream fluidly connecting an outlet of the separator to the anoxic reactor. The method of facilitating can comprise introducing a biofilm carrier into the aerobic reactor, and fluidly connecting a solids-rich outlet of the separator to an anaerobic digester.

Non-limiting examples of clarifiers or components thereof that can be utilized in one or more configurations of the present treatment systems include, but are not limited to the ENVIREX® Floc-Clarifer system, the SPIRACONE™ upflow sludge blanket clarifier, RIM-FLO® circular clarifier, and the TRANS-FLO® clarifier, from Siemens Industry, Inc.

Membrane bioreactor (MBR) systems that can be utilized in accordance with one or more configurations disclosed herein include, but are not limited to, the MEMPULSE™ membrane bioreactor system, the PETRO™ membrane bioreactor system, the Immersed Membrane Bioreactor System, and the XPRESS™ MBR Packaged Wastewater System, from Siemens Industry Inc.

Non-limiting examples of components or portions of anaerobic systems that can be utilized in one or more configurations of the wastewater systems include, but are not limited to, the DYSTOR® digester gas holder system, the CROWN® disintegration system, the PEARTH® digester gas mixing system, the PFT® spiral guided digester gas holder, the PFT® vertical guided digester holder, the DUO-DECK™ floating digester cover, and the PFT® heater and heat exchanger system, from Siemens Industry Inc.

The systems and components of the invention may also provide cost advantages relative to other wastewater treatment systems through use of biological processes in combination with anaerobic digestion. The wastewater treatment processes of the present invention can reduce sludge production through the use of various unit operations including biological processes and recycle streams. The wastewater treatment processes also overcome some of the technical difficulties associated with use of anaerobic wastewater treatment processes by, for example, concentrating or strengthening the sludge introduced into the anaerobic digester. The various processes can also generate methane as a product of the anaerobic digestion process, which can be used as an energy source. In certain embodiments, a large portion of the COD and BOD can be reduced using the anaerobic digester. This can reduce the aeration and oxygen requirements, and thus, operation costs, and increase the amount of methane produced that can be used as an energy source. Additionally because anaerobic digestion can be used to reduce COD and BOD in the sludge, the sludge yield can also be reduced.

The wastewater treatment processes of the present invention can also reduce the concentration of nitrogen containing compounds in the treated effluent, while also reducing the concentration of COD and/or BOD in the treated effluent. In certain embodiments of the present invention, the operating conditions and parameters of the system may be selected to achieve a desired hydraulic retention time of a biological reactor. The hydraulic retention time of one or more biological reactors in the system may be reduced, minimized, or optimized. The hydraulic retention time of a biological reactor may be selected to reduce, minimize, or optimize the hydraulic retention time and to promote treatment of the wastewater and provide for a treated effluent stream having particular desirable characteristics. In certain embodiments, the hydraulic retention time of an aerobic biological reactor may be selected to reduce, minimize, or optimize the hydraulic retention time to promote at least one of biosorption and nitrification. The nitrification may be accomplished at least in part by a consortium of nitrifying bacteria. In certain embodiments, the nitrifying bacteria may be in the form of a biofilm, or a nitrifying biofilm.

Biofilm may be grown on any suitable carrier or medium for promoting attachment of microorganisms and growth of the microorganisms and biofilm. The biofilm carrier may comprise a plurality of similarly shaped components of a suitable size and configuration, and having a suitable surface area to promote the growth of microorganisms and biofilm on its surface. The biofilm carrier may be one unit, or a plurality of units that impart a sufficient surface for promoting attachment of microorganisms and grown of the biofilm. The biofilm carrier may be made of any material suitable for these intended purposes. In certain examples, the biofilm carrier may be an inert material such as a polymeric material or ceramic material. The biofilm carrier in certain embodiments of the invention may be activated carbon, such as granular activated carbon or powder activated carbon.

The biofilm carrier may occupy any volume of a tank into which it is placed so long as it provides an adequate surface area for promotion of growth of microorganisms and biofilm on its surface. In certain embodiments, the biofilm carrier may occupy about 20% to about 75% of the volume of a tank. For example, the biofilm carrier may occupy about 66% of the volume of a tank.

In contrast to conventional anoxic-aerobic processes, wherein nitrification and denitrification is performed with hydraulic retention times of the aerobic biological reactor between about four and 12 hours, one or more of the present treatment systems can utilize an aerobic biological reactor that facilitates assimilation or biological sorption of suspended and/or dissolved materials and nitrification with hydraulic retention times of less than three hours.

Some other embodiments of the treatment systems of the invention can comprise collecting and/or converting various materials to produce a sludge material. For example, biological sorption processes can be employed to promote both adsorption and absorption processes that facilitate conversion of at least a portion of dissolved solids as well as suspended solids in the water or wastewater. In the adsorption process, ions and molecules of particles physically adhere or bond onto the surface of another molecule or compound. For example, the adsorption process can comprise attaching compounds or molecules to surfaces of soluble and insoluble particles in the wastewater to cause them to settle in a downstream clarifier. In absorption processes, chemical and biochemical reactions can occur in which compounds or substances in one state are converted into another compound or substance in a different state. For example, compounds in the wastewater can be converted to another compound, or can be incorporated by or into bacteria for the purpose of growing new bacteria. Aeration can be provided to the biological sorption process to mix and to provide an aerobic environment. The retention time in a biological sorption tank can be between a few minutes and several hours, for example, between about 15 minutes and three hours, more preferably between 30 minutes and two hours. Aeration therein can be effected to provide mixing and maintain an aerobic environment that facilitates biosorption, flocculation, and nitrification. Further flocculation or aggregation can be effected in the systems that utilize an aerobic treatment tank. In some cases, however, the aerobic treatment tank provides substantially all the dissolved oxygen into the biological sorption tank.

In some cases, the treatment system can involve unit operations that have various consortia of microorganisms that facilitate rapid return to steady state conditions following an upset. For example, the treatment system can circulate microorganisms that provide or facilitate anaerobic digestive activity, such as methogenic activity.

It was previously believed that methanogens were strict anaerobic bacteria that would die quickly in an aerobic environment. Various aspects of the invention, however, involve treatment systems and subsystems, unit operations, and components thereof that accommodate or increase the survivability of methanogenic organisms. One advantageous feature of the treatment systems of the present application involves providing a large amount of methanogens through the anaerobic recycle to the anoxic-aerobic process through the unique internal anaerobic sludge recycle path. At least a portion of the methanogenic bacteria return to the anaerobic digester, thereby seeding the anaerobic digester with methanogenic bacteria to join the existing population of the viable methanogens in the anaerobic digester. This reduces the need for the anaerobic digester to have a size and resultant hydraulic residence time or solids retention time to maintain a stable methanogenic bacteria population in the absence of bacterial seeding, as in previously known processes.

The concentration of seeding methanogenic bacteria, on a basis of a count of microorganisms, provided at the input of the anaerobic digester may in some embodiments be at least a target percentage, such as about 10% or more, of the concentration of the methanogenic bacteria present in the anaerobically digested sludge stream exiting the anaerobic digester. In some embodiments, this percentage may be, for example, 25% or more, 33% or more, 50% or more, or 75% or more. In some embodiments, the concentration of methanogenic bacteria provided at the input of the anaerobic digester may be a substantial fraction of the concentration of the methanogenic bacteria present in the anaerobically digested sludge stream exiting the anaerobic digester, for example, about 10% or more, about 30% or more, about 40% or more, or about 50% or more.

The anaerobic digester of systems in accordance with the present invention may be sized smaller than those in previously known systems. The methanogenic bacterial seeding of the anaerobic digester also provides for a safety factor against disruptions of the anaerobic digestion process. In the event of anaerobic digestion process upset or failure, the anaerobic digesters of the presently disclosed systems would recover faster than the anaerobic digesters in previously known systems because the seeding of the anaerobic digester with methanogenic bacteria would add to the rate replenishment of methanogenic bacteria in the anaerobic reactor due to the growth of these bacteria therein, reducing the time required for the anaerobic digester to achieve a desired concentration of methanogenic bacteria.

The advantage of methanogen recycle can be estimated as follow:

$$\theta_x = \frac{X_a V}{QX_a - QX_a^0}$$

Where
$\theta_x$=Solids retention time in anaerobic digester (days)
$X_a$=concentration of methanogens
$Q$=influent and effluent flow rate
$X_a^0$=concentration of methanogens in the inlet stream, which is normally considered zero for conventional activated sludge process.

If about 50% of methanogens survive in the anoxic-aerobic process and recycled back to the anaerobic digester, the solids retention time of the anaerobic digester could be doubled, or the size of the anaerobic digester decreased by half. For example, in previously known systems a hydraulic retention time in an anaerobic digester was in many instances set at between about 20 and about 30 days. With a treatment system operating in accordance some embodiments of the present application, this hydraulic retention time may be reduced by about 50% to between about 10 and about 15 days.

In other embodiments, the seeding of the anaerobic digester with recycled methanogenic bacteria may provide for decreasing the hydraulic residence time of sludge treated in the digester. This would result in a decreased cycle time, and thus an increased treatment capacity of the treatment system. Increasing the amount of methanogens recycled to the anaerobic digester, by, for example, increasing an amount of methanogens containing sludge directed into the digester, would provide greater opportunity to decrease the hydraulic residence time in the digester and increase the treatment capacity of the system.

In certain embodiments, the biological sorption tank is constantly seeded with nitrification bacteria (such as ammonia oxidizing and nitrite oxidizing biomass) which can survive the anaerobic digester and which can be recycled back to the aerobic environment. For example, nitrification and de-nitrification can take place in the biological sorption tank. Nitrification may be carried out by two groups of slow-growing autotrophs: ammonium-oxidizing bacteria (AOB), which convert ammonia to nitrite), and nitrite-oxidizing bacteria (NOB), which oxidize nitrite to nitrate. Both are slow growers and strict aerobes. In some embodiments of treatment systems disclosed herein, the nitrification bacteria are introduced to and/or grown in a bio-sorption tank, where they are captured in the floc. Some of the nitrification bacteria will pass out from the bio-sorption tank and be sent to an anaerobic digester.

It was previously believed that the strictly anaerobic conditions of the anaerobic digester would kill the nitrification bacteria. Various aspects of the invention, however, involve treatment systems and subsystems, unit operations, and components thereof that accommodate or increase the survivability of nitrification organisms in anaerobic and anoxic conditions that may occur in some biological nutrient removal processes. Nitrification bacteria which survive the anaerobic digester and are returned to the aerobic part of the treatment process may enhance the nitrification process performance in ways that can lower capital costs, for example by providing for a reduced aerobic treatment vessel size and/or reduced aerobic treatment hydraulic retention time and/or an increased safety factor that would render the nitrification process more stable in response to disruptions to the treatment process. Disruptions to the treatment process encompass deviations from desired operating parameters which may be caused by, for example, interruptions in flow of material through the treatment system or a loss of temperature control at one or more unit operations. The survival rate of nitrification bacteria in an anaerobic digester could be increased by decreasing a hydraulic residence time in the anaerobic digester, which would be accomplished if the anaerobic digester were seeded with recycled methanogens, as described above.

In certain embodiments of the invention, sludge processed through an anaerobic digester may also enter the anoxic tank and/or the biological sorption tank as a recycle stream to assist in the biological sorption and/or nitrification/denitrification processes. Other processed streams, such as a solids-lean portion or a sludge-lean portion exiting a thickener or clarifier, or a mixed liquor produced from a polishing unit can also be introduced as a recycle stream to the anoxic tank and/or the biological sorption tank to assist in the treatment process.

In other embodiments, some configurations can involve chemically facilitated sorption mechanisms.

Some embodiments of the treatment processes of the invention can comprise biologically treating at least a portion of the sludge from the wastewater to be treated. Biological treatment processes can be used to remove and/or biodegrade undesirable materials in the water to be treated, for example, organic pollutants. In certain embodiments, the biological treatment processes can be aerobic biological treatment processes. Depending on the operating conditions, at least a portion of the organic material in the water to be treated or sludge can be oxidized biologically and converted to carbon dioxide and water. In certain embodiments, the reduction in oxygen demand can be as high as about 80-90%. In some embodiments, a portion of the organic material in the water to be treated or sludge can be reduced only partially by utilizing a less than sufficient aeration rate or a less than sufficient residence time. For example, the reduction in oxygen demand can be less than 70%, less than 50%, less than 30%, or less than 10%. The water to be treated or sludge can be aerated and mixed for a period of time in, for example, an open tank using air diffusers or aerators. Aerobic biological treatment processes can be performed to provide a dissolved oxygen content of from about 0.2 mg/L to about 5 mg/L, or in some embodiments, from about 1.5 mg/L to about 2.5 mg/L. Retention time in the biological treatment tanks can be several weeks, or in some embodiments, in a range of from about one to about six hours, and in some embodiments, in a range of from about one to about two hours.

Some embodiments of the treatment systems of the invention can comprise a system capable of breaking down and/or converting various materials into other, more useful, end products. In this system, microorganisms can break down biodegradable material in the absence of oxygen. In this anaerobic digestion process, many organic materials can be processed, such as waste paper, grass clippings, food, sewage, and animal waste. This process can have the advantage of providing volume and mass reduction of the sludge being introduced into the system. The process can produce a methane and carbon dioxide rich biogas suitable for energy production. The anaerobic digestion process can comprise bacterial hydrolysis of the sludge being introduced into the digester which can break down insoluble organic polymers such as carbohydrates into sugars, amino acids, and fatty acids. In certain anaerobic digesters, acidogenic bacteria can then convert these intermediate materials into carbonic acids, alcohols, hydrogen, carbon dioxide, ammonia, and organic acids. The compounds converted by the acidogenic bacteria can be further digested by acetogenic microorganisms to produce acetic acid, carbon dioxide, and hydrogen. Methanogenic bacteria or methanogens can then convert the carbon dioxide, hydrogen, ammonia, and organic acids to methane and carbon dioxide. The methane produced from this anaerobic digestion process can be used as an energy source. In some embodiments, a greater concentration of methanogenic bacteria present in the anaerobic digester, or a greater amount of methanogenic bacteria recycled into the anaerobic reactor may result in a greater amount of methane produced.

In certain embodiments, the anaerobic digester is constantly seeded with a consortium of methanogens that reside in the sludge of the treatment process. Certain slow growing anaerobic bacteria such as acetoclastic methanogens and hydrogentrophic methanogens can survive in the aerobic environment of the present invention, and will return to the anaerobic digester allowing the anaerobic digester to be constantly seeded with a nontrivial level of methanogens. This allows for a more reliable treatment process, and allows for a smoother transition back to a steady state if a problem, such as a disruption in flow of material, occurs within the system. The seeding of the anaerobic digester may also, as discussed above, increase an amount of methane produced in the anaerobic digester.

The anaerobic digestion process can be operated at temperatures between 20° C. and 75° C., depending on the types of bacteria utilized during digestion. For example, use of mesophilic bacteria typically requires operating temperatures of between about 20° C. and 45° C., while thermophilic bacteria typically require operating temperatures of between about 50° C. and 75° C. In certain embodiments, the operating temperature may be between about 25° C. and about 35° C. to promote mesophilic activity rather than thermophilic activity. Depending on the other operating parameters, the retention time in an anaerobic digester can be between about seven and about fifty days retention time, and in some embodiments, between about 15 and about 30 days retention time. In certain embodiments, the reduction in oxygen demand can be about 50%.

In certain embodiments, the sludge that is processed through the anaerobic digester may be recycled back to the wastewater to be treated or to a biological treatment reactor, such as to the inlet of the anoxic tank or the biological sorption and nitrification tank. Prior to recycling the anaerobically digested sludge into the wastewater to be treated or to a biological treatment reactor, the anaerobic sludge may be processed through an aerobic conditioning tank to modify the characteristics of the anaerobically digested sludge.

Some other embodiments of the treatment system can comprise one or more systems capable of separation processes. The separation processes may separate certain portion of water to be treated or sludge. The separation processes may be capable of removing large materials from wastewater, for example, grit, sand, and gravel. Other separations processes can remove large insoluble material of the water to be treated such as, but not limited to fats, oils, and grease. Other separation systems may take advantage of the settling characteristics of materials, such as settleable solids and floating bodies. Various separations may employ unit operations such as settling tanks, clarifiers, thickeners, and filtration systems.

Some other embodiments of the treatment system can comprise one or more recycle streams that may deliver the output of a first unit operation to the inlet of a second unit operation upstream of the first unit operation. In certain embodiments, the output from an anaerobic digester, an aerobic digester, a sludge thickener, or an aerobic polishing unit can be recycled to the input of the primary clarifier or the biological sorption tank. In other embodiments, the output of an anaerobic digester can be recycled to the input of an anoxic biological reactor.

Some other embodiments of the treatment system can comprise a sequencing batch reactor that is fluidly connected or connectable to a source of wastewater to be treated. The sequencing bioreactor may biologically treat the wastewater by promoting biosorption, degradation, or conversion of biodegradable material, followed by settling and/or decanting the mixed liquor comprising the material. The sequencing batch reactor can be fluidly connected or connectable to an anaerobic digester located downstream from the reactor.

FIG. 1 exemplarily illustrates an embodiment in accordance with some aspects of the invention. The treatment system 10 can be fluidly connected or connectable to a source 110 of water to be treated. In accordance with any one of the aforementioned aspects of the invention, treatment system 10 can comprise one or more treatment unit operations, which may include one or more biological treatment processes and one or more solids-reducing and solids-collecting systems or processes.

Source 110 of water or wastewater to be treated can be a water collection system from any one or more of a municipality, a residential community, and an industrial or a commercial facility, and an upstream pre-treatment system, or combinations thereof. For example, source 110 can be a sedimentation or settling tank receiving water from a sewer system.

Treatment system 10 can comprise one or more biological treatment reactors or tanks, such as anoxic tank 112 that promotes denitrification of at least a portion of dissolved and suspended solids contained therein. Anoxic tank 112 can comprise or is configured to contain a biomass of microorganisms that can metabolize biodegradable materials in the wastewater to be treated. For example, anoxic tank 112 can comprise or is configured to contain a biomass of microorganisms that processes biodegradable materials in the water to be treated through denitrification processes that convert nitrogen containing materials, such as nitrates, to nitrogen gas ($N_2$). The anoxic tank may be maintained at conditions to promote growth and maintenance of a biomass of microorganisms that can participate in the denitrification process.

The anoxic tank 112 produces a denitrified mixed liquor 212 which can be introduced into one or more biological treatment reactors or tanks, such as biological treatment tank 114 that promotes aggregation of at least a portion of dissolved and suspended solids contained therein. Biological treatment tank 114 can comprise or is configured to contain a biomass of microorganisms that can biosorb biodegradable materials in the water to be treated. Biological treatment tank 114 can also comprise or is configured to contain a biofilm carrier that can promote biofilm growth on the carrier. For example, biological treatment tank 114 can comprise or is configured to contain a biomass of microorganisms that processes biodegradable materials in the water to be treated through absorption of the biodegradable materials. Biological treatment tank 114 can also comprise or is configured to contain substances or compounds for promotion of adsorption of soluble and insoluble material, such as organic compounds, in the wastewater or water to be treated. Biological treatment tank 114 can also comprise or is configured to contain a nitrifying biofilm for the promotion of conversion of nitrogen containing compounds, such as ammonia, to nitrites and nitrates. The biological sorption and nitrification processes may include aeration and mixing to help maintain the aerobic environment within biological treatment tank 114.

The biological treatment tank 114 produces a nitrified mixed liquor 214 which can be introduced into a separator such as clarifier 116 to produce a solids-lean stream 218 and a solids-rich sludge 219. A portion of nitrified mixed liquor 214 may be recycled to the wastewater to be treated or to biological treatment tank 112 by recycle line 216. The solids-lean stream 218 can be processed further, for example, to render the at least partially treated water to be suitable for discharge or to a polishing unit (not shown), to produce treated product or effluent 120, which can be suitable for other uses.

Solids-rich sludge 219 can be divided allowing at least a portion of solids-rich sludge 220 to be recycled back to source of wastewater to be treated 110, combined therewith, or introduced into one or more biological treatment tanks or other unit operations of the treatment system.

At least a portion of solids-rich sludge 219 can be introduced to biological reactor such as an anaerobic digester 122 to produce a biologically treated sludge or an anaerobically digested sludge 226. A portion of the biologically treated sludge or anaerobically digested sludge 226 can be disposed of as a waste sludge 130. A portion of the anaerobically digested sludge 226 can also be recycled back to the source of wastewater 110, combined therewith, or introduced into one or more biological treatment tanks or other unit operations of the treatment system. The portion of the biologically treated sludge or anaerobically digested sludge 226 that is recycled can be any portion that is desirable depending on the operating parameters of the system and/or desired effluent properties or characteristics. For example, the portion of the biologically treated sludge or the anaerobically digested sludge recycled can be selected based on a predetermined flow rate. The recycled portion can be based on a predetermined flow rate, or a portion or percentage of a predetermined flow rate. For example, in certain embodiments, the recycled portion may be approximately 50% of the predetermined flow rate.

Optionally, prior to introducing at least a portion of the solids-rich sludge 219 to the anaerobic digester 122, at least a portion of the solids-rich sludge 219 can be introduced by way of line 222 to a thickener 118 to produce a thickened sludge 228 and a sludge-lean portion 224. The thickened sludge 228 can then be introduced into the biological reactor or anaerobic digester 122 and the sludge-lean portion 224 can be recycled back to the source of wastewater 110, combined therewith, or introduced into one or more biological treatment tanks or other unit operations of the treatment system.

Any portion between zero and 100 percent of the solids-rich sludge 219 can be recycled back to source of wastewater to be treated 110, combined therewith, or introduced into one or more biological treatment tanks or other unit operations of the treatment system, the remainder being directed to the anaerobic digester. In certain examples, the portion introduced into the thickener 118 or the anaerobic digester 122 can be between about two and about twenty percent of the solids-rich sludge 219. In other examples, the portion of the solids-rich sludge 219 introduced into the thickener 118 or the anaerobic digester 122 can be between about four and about eight percent of the solids-rich sludge 219.

Any portion between zero and 100 percent of the of the anaerobically digested sludge 226 can also be recycled back to the source of wastewater 110, combined therewith, or introduced into one or more biological treatment tanks or other unit operations of the treatment system, the remainder being disposed of as a waste sludge 130. In certain examples, the portion recycled to the source of wastewater, combined therewith, or introduced into one or more biological treatment tanks or other unit operations of the treatment system can be between about zero and about twenty percent of the anaerobically digested sludge 226. In other examples, the recycled portion can be between about four and about eight percent of the anaerobically digested sludge 226.

In certain examples, the treated product 120 can be monitored for dissolved solids content, COD/BOD, total nitrogen, particular nitrogen containing compounds such as ammonia, nitrite, or nitrate, or other identified characteristics. If the level of any one identified characteristic is not within a desired range or at a desired level, adjustments can be made to the treatment system. For example, if the COD of the treated product deviates from a desired level or acceptable range, a greater or lesser portion of anaerobically treated sludge 226 can be discharged as waste sludge 130.

In certain embodiments, the treated portion may have a characteristic or property related to the concentration of particular components therein. For example, the treated portion can have a concentration of nitrogen containing components or BOD or COD content that is below a certain value. In certain examples, the treated product or effluent may have an ammonia concentration of less than about five milligrams of elemental nitrogen per liter. The treated product or effluent may have a COD concentration of less than about 80 milligrams per liter.

The system 10 can have one or more primary separators. For example, a primary clarifier (not shown) fluidly connected to a source 110 of water or wastewater to be treated can be utilized to allow settling of at least a portion of components of the source 110 of water to be treated so that solids-lean wastewater can be produced and introduced to a biological treatment tank 112. The primary clarifier can also produce a solids-rich wastewater stream which may be combined with a solids-rich sludge 220 or 222 or thickened sludge 228 to be introduced into an anaerobic digester 122, discussed in more detail below. The separators of the system that can be utilized, including but not limited to the primary separator, include filters and dissolve air flotation type units, with or without grit removal.

One or more configurations of the treatment systems as disclosed herein can comprise one or more polishing units using treatment processes including, but not limited to biological nitrification/denitrification and phosphorus removal, chemical oxidation, chemical precipitation, and separation systems including dissolved inorganic solids removal by ion exchange, ultrafiltration, reverse osmosis, ultraviolet radiation, or electrodialysis. Treated product 120 from the one or more polishing units can be delivered to storage, to a secondary use, or discharged to the environment.

One or more nitrification units can be utilized. For example, a biofilm nitrification unit, which can be, for example, a moving bed bioreactor, can be disposed to receive at least a portion of the solids-lean stream from the separator. Effluent from the nitrification unit can be mixed with sludge from a clarifier to effect at least partial de-nitrification. Re-aeration can then be performed to remove at least a portion of nitrogen as a gas. Such variations can reduce or eliminate the use of external carbon sources.

During operation of the treatment system, one or more target characteristics can be utilized to regulate one or more operating parameters of any of the unit operations of the system.

A precipitation rector may be included in any of the systems disclosed herein to precipitate out one or more desired compounds for example, phosphorous and/or nitrogen from one or more streams from the system.

The precipitation reactor may be utilized to precipitate out phosphorous and/or nitrogen containing compounds, for example struvite (MgNH$_4$PO$_4$.6H$_2$O), by the addition of precipitating agents, such as a magnesium salt (e.g., magnesium chloride) in the precipitation reactor in accordance with the reaction below.

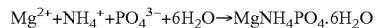

$$Mg^{2+}+NH_4^{+}+PO_4^{3-}+6H_2O \rightarrow MgNH_4PO_4.6H_2O$$

In some applications, it would be beneficial to utilize a precipitation agent such as a magnesium salt to precipitate out the phosphorous and nitrogen in the precipitation reactor rather than, for example, aluminum or iron. Struvite may be used as a fertilizer, and thus may be an agriculturally useful precipitate. Precipitating phosphorous in the precipitation vessel using aluminum may produce an aluminum phosphate precipitate, which is unsuitable for use as a fertilizer, and thus would not be as agriculturally valuable as struvite. Similarly, precipitating phosphorous with iron may produce iron phosphate, which is also unsuitable for use as a fertilizer. In other embodiments, one or both of aluminum phosphate and/or iron phosphate may be precipitated from a solids-lean output stream from the separator for use in other applications.

A pH adjuster, such as ammonium hydroxide, magnesium hydroxide, another caustic, or an acid may also be added to the solids-lean output stream in the precipitation reactor to control an Mg$^{2+}$ concentration and/or pH to within desired ranges.

In some embodiments the precipitation reaction may take place at a temperature in a range of from about 20° C. to about 40° C., or in some embodiments from about 25° C. to about 35° C. at a pH of between about 6 and about 12, in some embodiments between about 7.5 and about 11, and in some embodiments, between about 8.5 and about 10. In some embodiments, after precipitation of struvite the phosphorous-lean liquid may be recycled back to the activated sludge treatment system. In some embodiments the phosphorous-lean liquid may be pH adjusted to a pH of, for example, about 7 by the introduction of a pH adjuster, for example, an acid or a base from a source of pH adjuster prior to being recycled back to the activated sludge treatment system. In other embodiments, the phosphorous-lean liquid recycled back to the activated sludge treatment system may be allowed to maintain an alkaline pH, or be pH adjusted to an alkaline pH. The alkalinity may in some embodiments assist in a nitrification process performed in the activated sludge treatment system.

The amount of precipitating agent (e.g., magnesium chloride) may be determined based on an analysis of the concentration of phosphorous and/or nitrogen in the solids-lean stream directed into the precipitation reactor. In some embodiments, the precipitating agent may be added in a stoichiometric ratio to phosphorous or nitrogen present in the solids-lean stream, e.g., one molecule of magnesium for each molecule of phosphorous or nitrogen in the solids-lean stream. In other embodiments, a slightly higher, for example about 10% higher, than stoichiometric ratio of precipitation agent to phosphorous or nitrogen in the solids-lean stream may be added. In other embodiments, less than a stoichiometric ratio may be added.

The various systems and techniques disclosed herein can significantly reduce energy consumption, or even provide energy, and also reduce the amount of sludge produced during wastewater treatment.

Further, a controller can facilitate or regulate the operating parameters of the treatment system. For example, a controller may be configured to adjust a rate of recycle of the one or more streams, a duration of one or more residence times, a temperature, and/or a dissolved oxygen concentration in a fluid in any of the unit operations of the treatment system.

The controller may respond to signals from timers (not shown) and/or sensors not shown) positioned at any particular location within the treatment system. For example, a sensor positioned in the anaerobic reactor may indicate less than optimum conditions therein. Further, the one or more sensors may monitor one or more operational parameters such as pressure, temperature, one or more characteristics of the liquor, and/or one or more characteristics of any of the effluent streams or wastewater stream. Similarly, a sensor disposed in or otherwise positioned with any of the recycle streams can provide an indication of a flow rate thereof at, below, or above a desired or target rate. The controller may then respond by generating a control signal causing an increase or decrease in the recycle flow rate. The target recycle flow rate of the mixed liquor from the polishing sub-train may be dependent on an operating parameter of the treatment system. For example, the target recycle flow rate may be a multiple of, e.g., at least two times, or four times the influent flow rate of the incoming water to be treated. In some cases, the solids discharge rate may be adjusted to achieve one or more target characteristics of the treated water. Other control schemes may involve proportionally varying the relative flow rates between the anaerobic digester and the aerobic treatment tank based at least partially on the oxygen demand of the influent or water to be treated.

The system and controller of one or more embodiments of the invention provide a versatile unit having multiple modes of operation, which can respond to multiple inputs to increase the efficiency of the wastewater treatment system.

The controller may be implemented using one or more computer systems which may be, for example, a general-purpose computer such as those based on an Intel PENTIUM®-type processor, a Motorola PowerPC® processor, a Hewlett-Packard PA-RISC® processor, a Sun UltraSPARC® processor, or any other type of processor or combination thereof. Alternatively, the computer system may include specially-programmed, special-purpose hardware, for example, an application-specific integrated circuit (ASIC) or controllers intended for water treatment systems.

The computer system can include one or more processors typically connected to one or more memory devices, which can comprise, for example, any one or more of a disk drive memory, a flash memory device, a RAM memory device, or other device for storing data. The memory may be used for storing programs and data during operation of the system. For example, the memory may be used for storing historical data relating to the parameters over a period of time, as well as operating data. Software, including programming code that implements embodiments of the invention, can be stored on a computer readable and/or writeable nonvolatile recording medium, and then copied into memory wherein it can then be executed by one or more processors. Such programming code may be written in any of a plurality of programming languages, for example, Java, Visual Basic, C, C#, or C++, Fortran, Pascal, Eiffel, Basic, or any of a variety of combinations thereof.

Components of the computer system may be coupled by one or more interconnection mechanisms, which may include one or more busses, e.g., between components that are integrated within a same device, and/or a network, e.g., between components that reside on separate discrete devices. The interconnection mechanism may enable communications, e.g., data and/or instructions, to be exchanged between components of the system.

The computer system can also include one or more input devices, for example, a keyboard, mouse, trackball, microphone, touch screen, and other man-machine interface devices as well as one or more output devices, for example, a printing device, display screen, or speaker. In addition, the computer system may contain one or more interfaces that can connect the computer system to a communication network, in addition or as an alternative to the network that may be formed by one or more of the components of the system.

According to one or more embodiments of the invention, the one or more input devices may include sensors for measuring any one or more parameters of any of the systems disclosed herein and/or components thereof. Alternatively, the sensors, the metering valves and/or pumps, or all of these components may be connected to a communication network that is operatively coupled to the computer system. Any one or more of the above may be coupled to another computer system or component to communicate with the computer system over one or more communication networks. Such a configuration permits any sensor or signal-generating device to be located at a significant distance from the computer system and/or allow any sensor to be located at a significant distance from any subsystem and/or the controller, while still providing data therebetween. Such communication mechanisms may be affected by utilizing any suitable technique including but not limited to those utilizing wireless protocols.

The controller can include one or more computer storage media such as readable and/or writeable nonvolatile recording medium in which signals can be stored that define a program to be executed by one or more processors. The medium may, for example, be a disk or flash memory. In typical operation, the one or more processors can cause data, such as code that implements one or more embodiments of the invention, to be read from the storage medium into a memory that allows for faster access to the information by the one or more processors than does medium.

Although the computer system is described by way of example as one type of computer system upon which various aspects of the invention may be practiced, it should be appreciated that the invention is not limited to being implemented in software, or on the computer system as exemplarily shown. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by a controller can be performed in separate computers, which can be in communication with one another through one or more networks.

In some particular embodiments, the controller can be configured to generate a plurality of output signals that initiates or terminates one or more cycles or stages of a sequencing batch reactor. For example, the controller can generate an output signal that actuates one or more inlet valves that fluidly connects one or more basins of the at least one sequencing batch reactor to the source of water to be treated. The controller can then generate a second output signal that preferably, but not necessarily, closes the valve and, activates an aeration system of at least one sequencing batch reactor to provide an oxygen source to achieve or maintain a target dissolved oxygen level of, for example, between about 0.5 and about 2 mg/L. The controller can thus be configured to facilitate biological sorption phenomena that aggregates at least a portion of dissolved and suspended solids and/or nitrification. The controller can then generate a third output signal that promotes quiescent conditions in at least one of the basins that provide settling of at least a portion of the settleable components. In some cases, quiescent conditions can be effected by terminating output signals and the third output signal can be generated by the controller to promote withdrawal of any of the supernatant, e.g., by decanting, or solids-rich portions in the basin, after settling. Another output signal can then be generated, e.g., a fifth output signal, that reactivates the aeration system. The controller can further generate a sixth output signal that activates, and a seventh output signal that deactivates an aeration system of at least one aerobic treatment tank to provide an oxygen source to achieve or maintain a target dissolved oxygen level of, for example, between about 0.5 and about 2 mg/L.

Many municipal wastewater treatment plants experience diurnal influent variation. In some embodiments, a biosorption operation or nitrification-denitrification of a wastewater treatment system may become less stable, for example, capturing more or less COD in influent wastewater or removing less nitrogen containing compounds in influent wastewater, as loading conditions become more dynamic. If biosorption or nitrification-denitrification fails to capture or remove a sufficient amount of the COD or nitrogen containing compounds, this may overload the capacity of a downstream anaerobic digester to efficiently process the COD or downstream polishing processes. To facilitate enhancing the reliability of the performance of the biosorption process or nitrification-denitrification process a control system that uses on-line instruments to control the biosorption and nitrification-denitrification may be utilized.

Feed back control may be utilized in some embodiments of the control system. An online COD or total organic carbon (TOC) meter, or a nitrogen content meter may be utilized to measure the COD or TOC, or nitrogen content of solids-lean effluent leaving the separator located downstream of the nitrification-denitrification system. When the effluent COD or TOC or nitrogen content is at or above a threshold level at which the treatment system would efficiently treat the influent wastewater, the flow rate of at least one of the influent wastewater stream and any one or more of recycle streams, or a ratio of any one stream to another may be adjusted. This may be facilitated by for example, utilizing a controller to actuate one or more valves to adjust the amount of an output of at least one biological reactor or unit operation in the system. When effluent COD or TOC, or nitrogen is at a level such that the treatment system could efficiently treat wastewater having a higher COD or TOC level, or nitrogen content, the flow rate of any one of the wastewater stream and the recycle streams may be adjusted.

Further aspects of the invention can involve or be directed to computer-readable media, or providing computer-readable media, that facilitates the various features of the treatment approaches described herein.

For example, the computer-readable media can comprise instructions implementable on a computer system or a controller that performs a method of treating wastewater in a wastewater treatment system, the method comprising one or more steps of providing a wastewater to be treated and denitrifying the wastewater in a first biological reactor to produce a denitrified mixed liquor. The method can also comprise nitrifying the denitrified mixed liquor with a nitrifying biofilm on a carrier and biosorbing undesirable constituents from the denitrified mixed liquor with a suspended biomass in a second biological reactor. The method can further comprise separating a first portion of the nitrified mixed liquor in a separator to produce a solids-rich sludge and a treated effluent having a total nitrogen concentration of less than about 10 milligrams of elemental nitrogen per liter, and combining a second portion of the nitrified mixed liquor with the wastewater to be treated.

In other configurations, the computer-readable media can comprise instructions implementable on a computer system or a controller that performs a method of treating wastewater in a wastewater treatment system, the method having one or more steps for treating wastewater, the method comprising providing a wastewater to be treated, and promoting denitrification of the wastewater in a first biological reactor to produce a first biologically treated mixed liquor. The method for treating wastewater can also comprise promoting biological sorption of the first biologically treated mixed liquor and biofilm growth in the second biological reactor. The method for treating wastewater can further comprise separating an effluent of the second biological reactor to produce a solids-rich sludge and a treated effluent having a total nitrogen concentration of less than about 10 milligrams of elemental nitrogen per liter, and treating the solids-rich sludge in a third biological reactor to produce a biologically treated sludge.

The function and advantage of these and other embodiments of the systems and techniques disclosed herein will be more fully understood from the example below. The following example is intended to illustrate the benefits of the disclosed treatment approach, but do not exemplify the full scope thereof.

Example 1

Ammonia removal was measured utilizing a treatment system 10 as shown in FIG. 1.

Treatment system 10 comprises a source of wastewater 110 to be treated. The source of wastewater 110 is fluidly connected to a primary clarifier (not shown) to allow settling of at least a portion of components of the source of wastewater to be treated. A solids-lean wastewater is then introduced into anoxic tank 112 to produce a denitrified mixed liquor 212 which can be introduced into biological treatment tank 114. Biological treatment tank 114 promotes biosorption of biodegradable materials in the denitrified mixed liquor and also promotes biofilm growth and nitrification of the denitrified mixed liquor. The biological treatment tank 114 produces a nitrified mixed liquor 214 which is introduced into a clarifier 116 to produce a solids-lean stream 218 and a solids-rich sludge 219. A portion of the nitrified mixed liquor 214 is recycled to the wastewater to be treated to be introduced to anoxic tank 112 by recycle line 216. The solids-lean stream 218 is directed to one or more downstream polishing units 120.

The solids-rich sludge 219 is divided allowing a portion of solids-rich sludge 220 to be recycled back to source of wastewater to be treated 110 to be introduced into anoxic tank 112.

A portion of the solids-rich sludge 219 can be introduced to an anaerobic digester 122 to produce an anaerobically digested sludge 226. A portion of the anaerobically digested sludge 226 is disposed of as a waste sludge 130. A portion of the anaerobically digested sludge 226 can also be recycled back to the source of wastewater 110 to be introduced into anoxic tank 112.

Prior to introducing at least a portion of the solids-rich sludge 219 to the anaerobic digester 122, a portion of the solids-rich sludge 219 is introduced by way of line 222 to a thickener 118 to produce a thickened sludge 228 and a sludge-lean portion 224. The thickened sludge 228 is introduced into the anaerobic digester 122 and the sludge-lean portion 224 is recycled back to the source of wastewater 110, to be introduced into the anoxic reactor 112.

During this process the hydraulic retention time in the anoxic tank 112 is between about 1-3 hours and the hydraulic retention time in the biological reactor 114 is between about 3 hours.

Upon start-up of this system, a biofilm carrier is added to biological reactor 114. The biofilm carrier is made of a polymeric material and occupies about 66% of the volume of a tank, or approximately 32 $m^2$ of surface area for biofilm to grow. Zero percent of the anaerobically digested sludge is recycled back to the source of wastewater 110 to be introduced into the anoxic reactor 112. During this start-up period, the anaerobically digested sludge is disposed of as a waste sludge 130. Without wishing to be bound by theory, it is believed that operating the system without recycling the anaerobically digested sludge allows biofilm to grow on the biofilm carriers in biological reactor 214. After approximately one month, approximately 4.1% of the anaerobically digested sludge was recycled back to the source of wastewater 110 to be introduced into the anoxic reactor 112. After 18 days, at 4.1% recycle, the recycle rate was increased to 8.1% of the anaerobically digested sludge.

Figure 2:
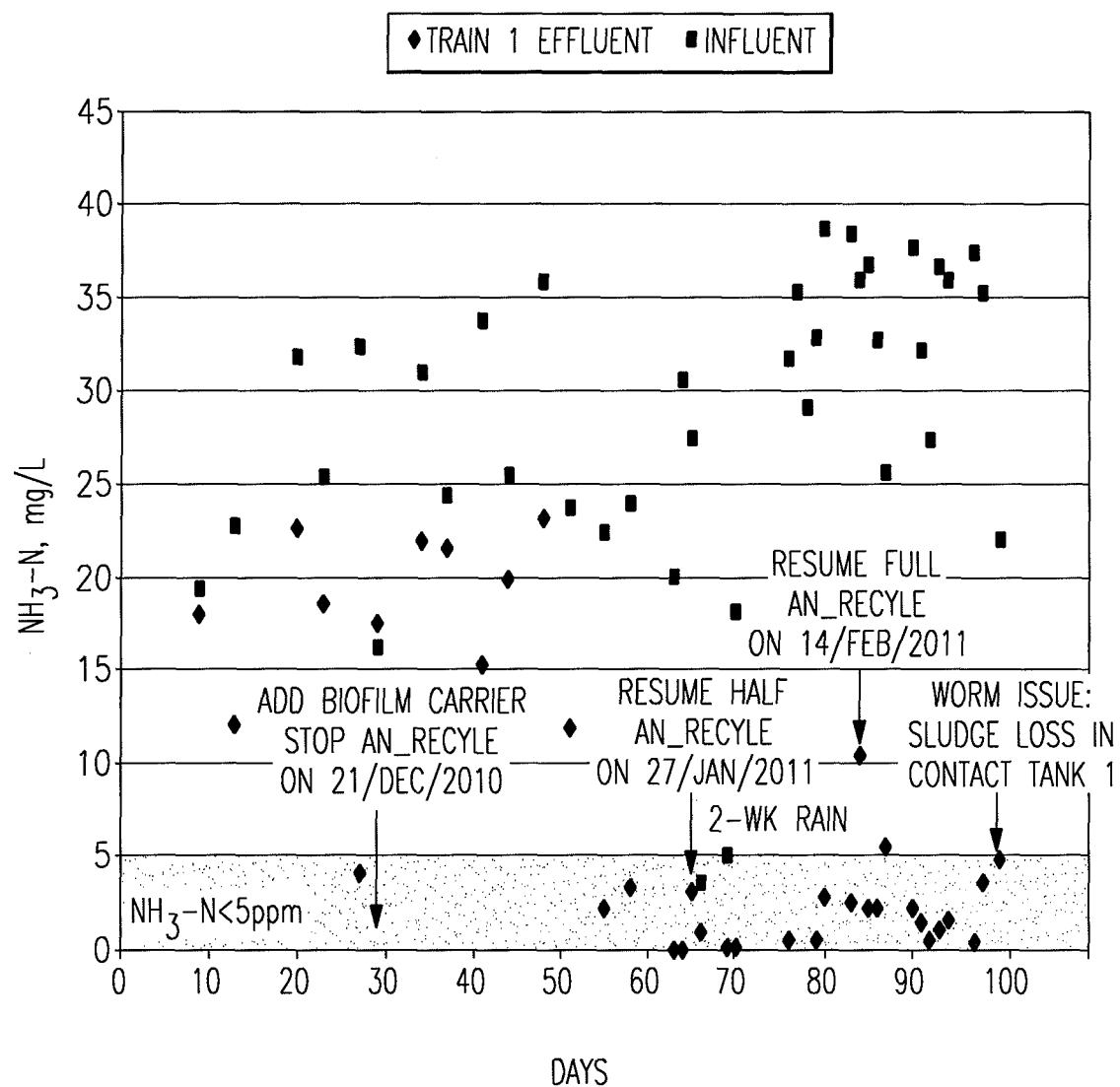
FIG. 2 is a graph of ammonia-nitrogen concentration versus time pertinent to one or more aspects of the invention.
Figure 3:
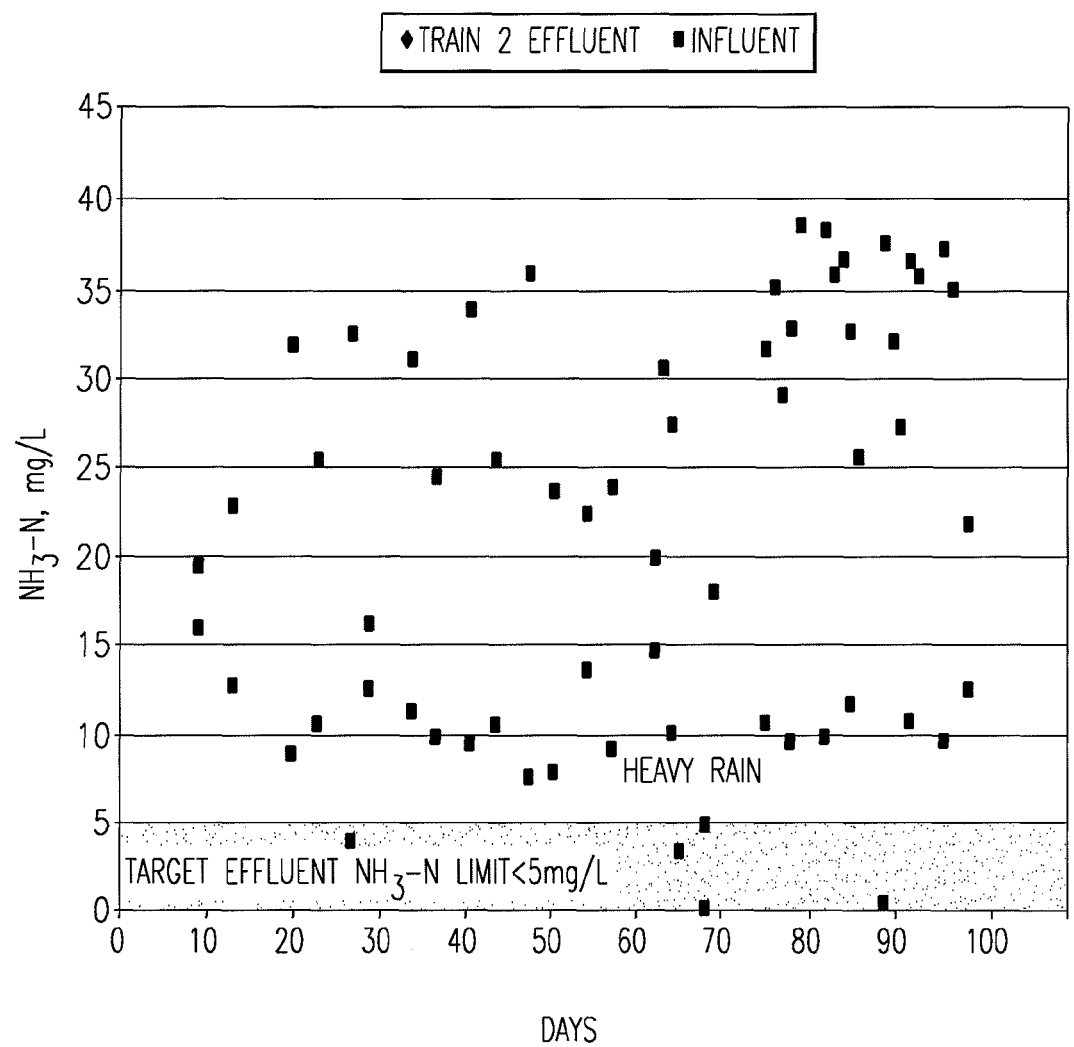
FIG. 3 is a graph of ammonia-nitrogen concentration versus for a wastewater treatment process.
Figure 4:
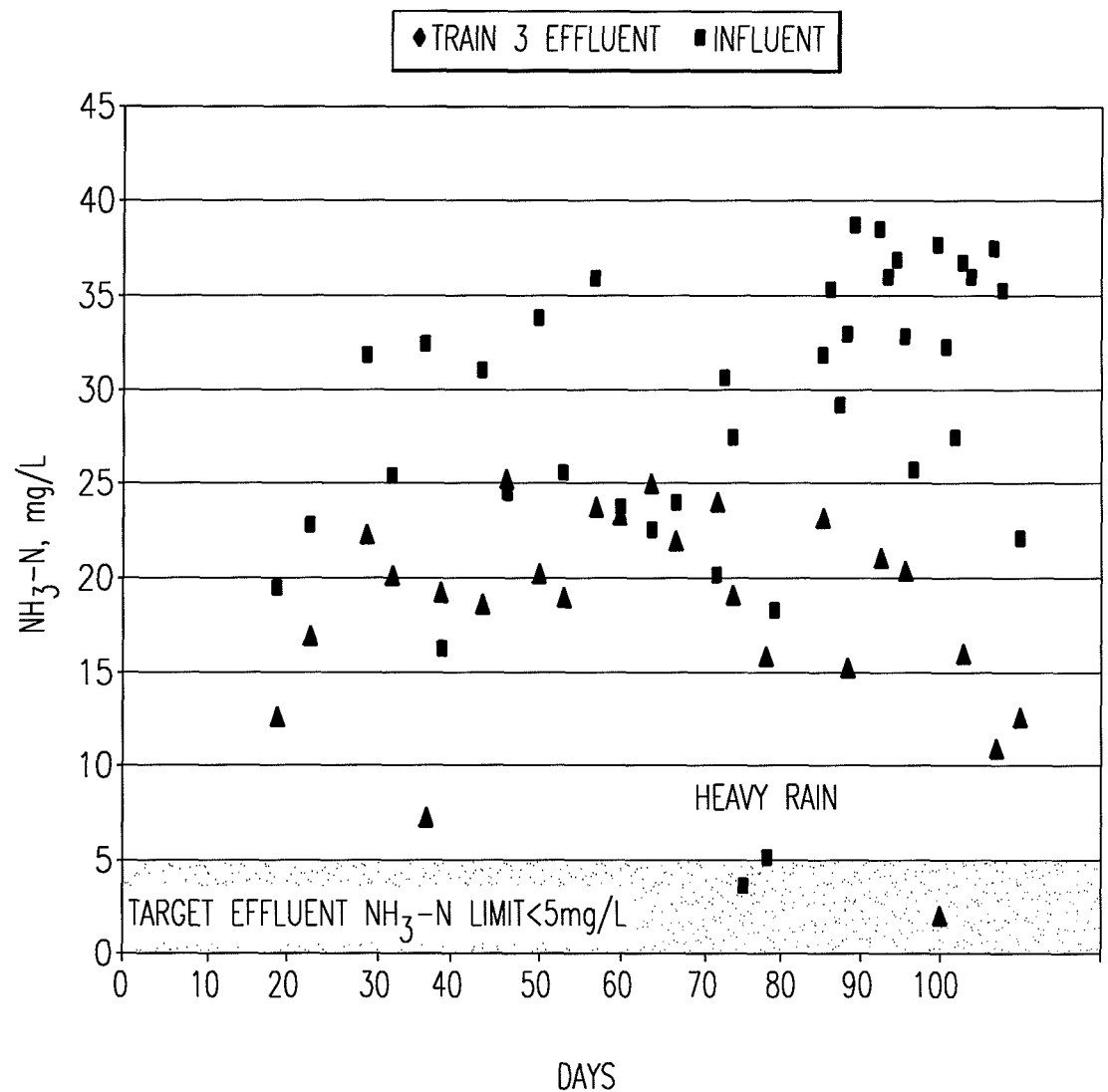
FIG. 4 is a graph of ammonia-nitrogen concentration versus time for a wastewater treatment process.

FIG. 2 shows the improved nitrogen removal in the effluent stream 218, as compared to nitrogen removal achieved in a biological treatment process shown in FIG. 3 in which the hydraulic retention time of the aerobic process is in the range of about 4 to 12 hours, and as compared to another process utilizing bio-sorption, contact stabilization, and anaerobic digestion shown in FIG. 4 in which the hydraulic retention time of the combined bio-soprtion process and contact stabilization processes is about 2.5 hours. In FIG. 2, ammonia-nitrogen levels were consistently reduced to below 5 ppm, while in FIGS. 3 and 4, which show the other processes, these low levels of ammonia-nitrogen could not be achieved. It has been shown that ammonia-nitrogen levels can be consistently reduced below 5 ppm for over three months.

Figure 5:
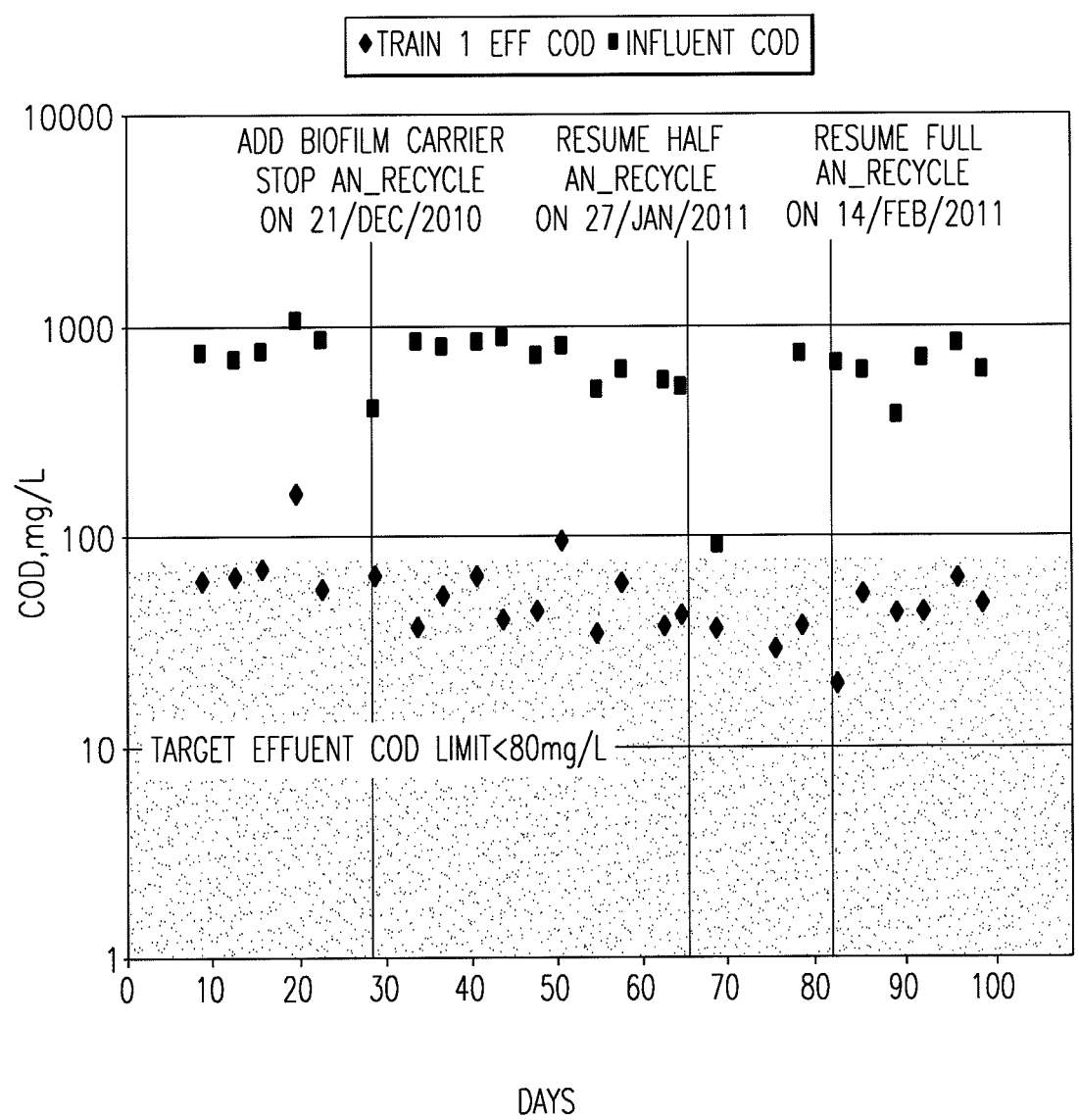
FIG. 5 is a graph of chemical oxygen demand (COD) concentration versus time pertinent to one or more aspects of the invention.
Figure 6:
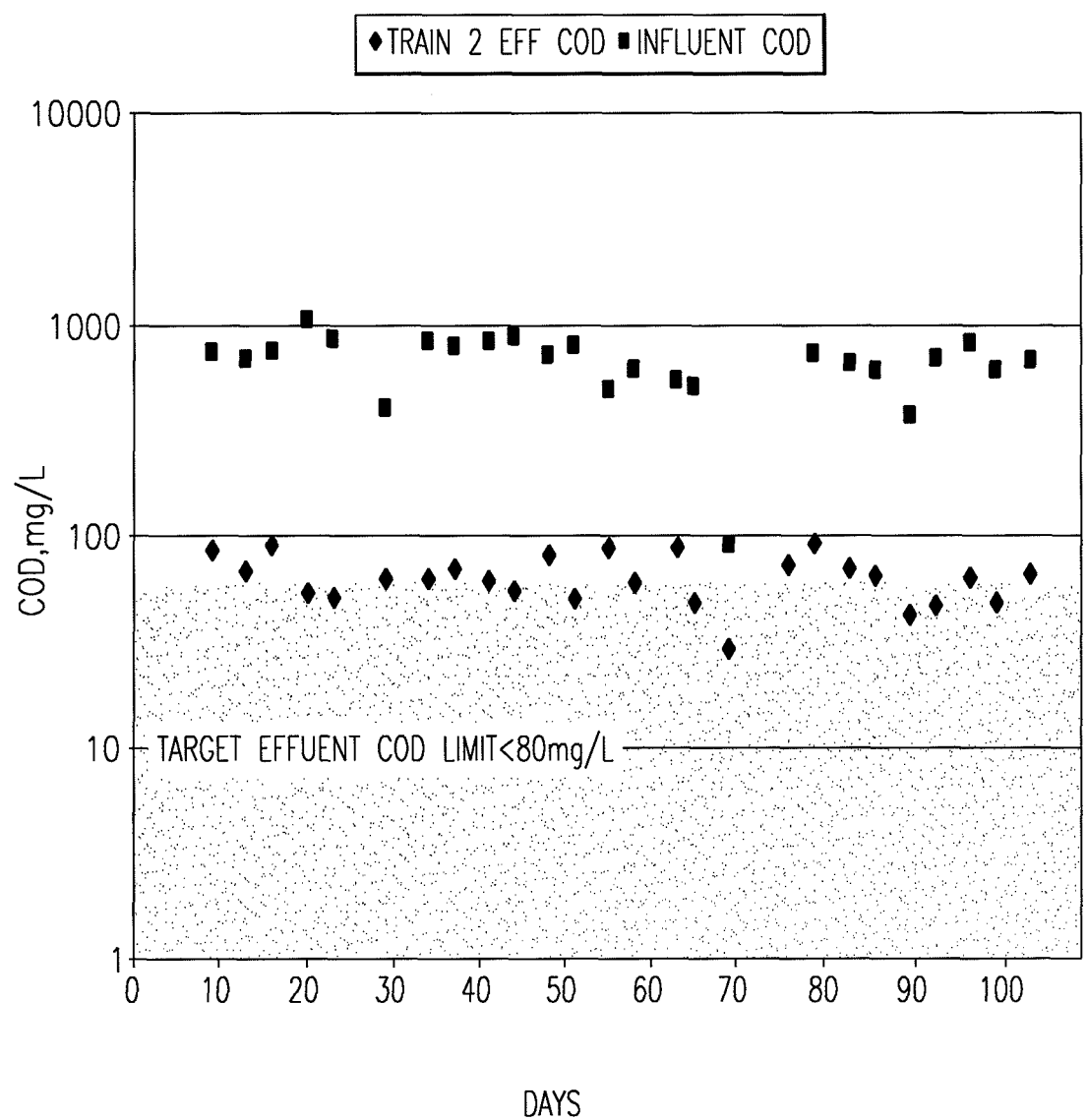
FIG. 6 is a graph of COD concentration versus time for a wastewater treatment process.
Figure 7:
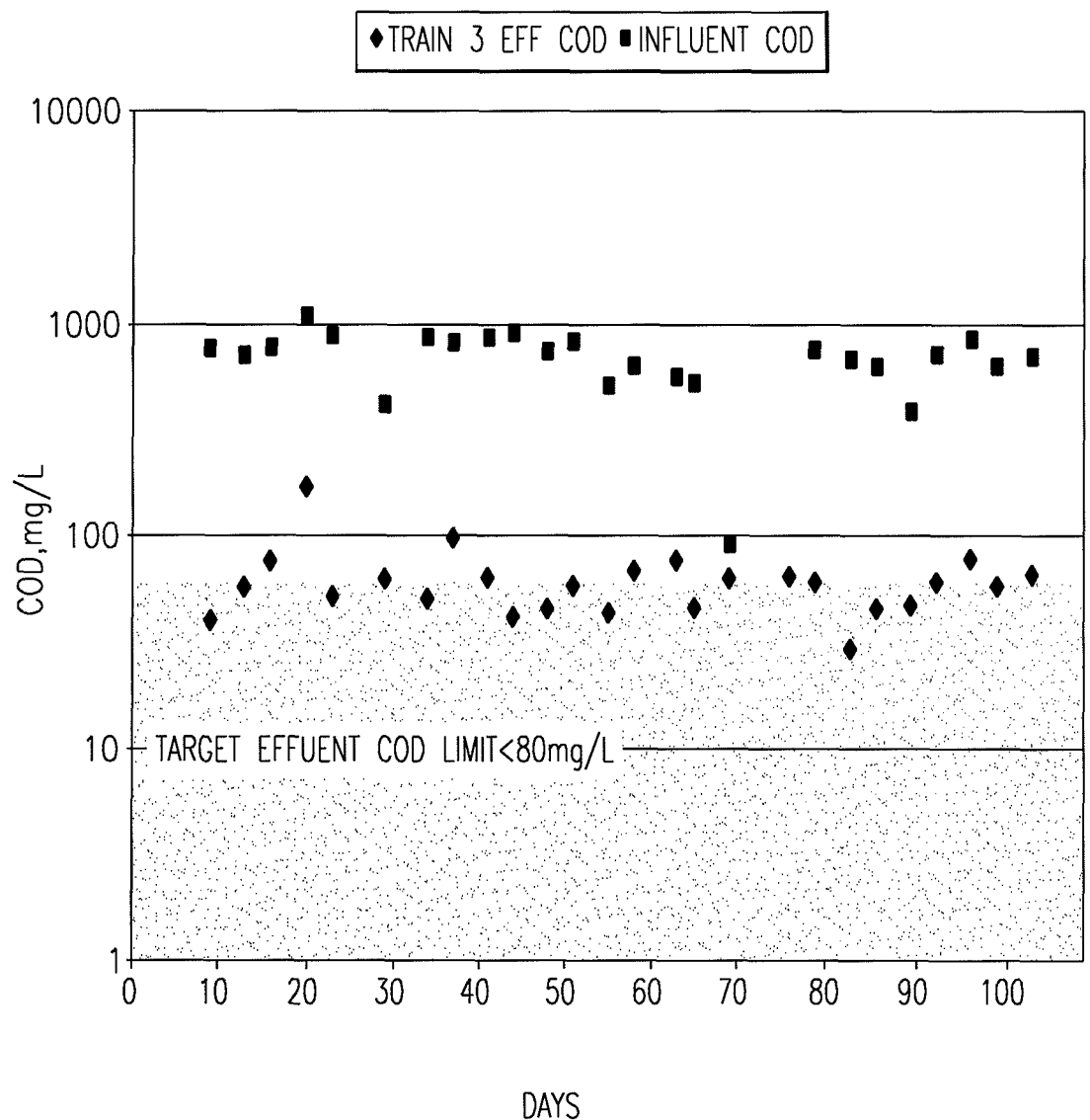
FIG. 7 is a graph of COD concentration versus time for a wastewater treatment process.

It was also found, as shown in FIG. 5, that in addition to reducing ammonia-nitrogen levels to below 5 ppm that the COD levels in effluent stream 218 were consistently reduced to below 80 mg/L. This level remained consistent in each of the wastewater treatment processes tested, as shown in FIGS. 6 and 7. As with the reduced nitrogen levels, the processes of the present invention can consistently reduce COD levels in the effluent stream to below 80 mg/L for over three months.

This example demonstrates that the process as described above is effective in maintaining levels of nitrogen and COD levels in the effluent stream below specific target values, and at a lower hydraulic retention time than a conventional anoxic-aerobic process. The shortened hydraulic retention time over conventional anoxic-aerobic processes reduces operating costs by providing more effective and efficient treatment of wastewater.

Those skilled in the art would readily appreciate that the various parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments described herein. For example, those skilled in the art may recognize that the system, and components thereof, according to the present invention may further comprise a network of systems or be a component of treatment system. It is, therefore, to be understood that the foregoing embodiments are presented by way of example only and that, within the scope of the appended claims and equivalents thereto, the disclosed treatment systems and techniques may be practiced otherwise than as specifically described. For example, although the term "solids-lean sludge" has been used herein to refer to a separation product, the term has been used only for illustrative purposes and its use does not limit the scope of the claims to a particular separation technique. The present treatment systems and techniques are directed to each individual feature, system, or method described herein. In addition, any combination of two or more such features, systems or methods, if such features, systems or methods are not mutually inconsistent, is included within the scope of the present invention.

Further, it is to be appreciated various alterations, modifications, and improvements will readily occur to those skilled in the art. Such alterations, modifications, and improvements are intended to be part of this disclosure, and are intended to be within the spirit and scope of the invention. For example, a portion of solids-rich stream or the sludge stream can be introduced to an upstream unit operation, such as a primary clarifier, or a biological sorption tank, or both. In other cases, the solids-leans portion or the sludge-lean portion can be directed to another separator and/or to a polishing unit. In other instances, an existing treatment facility may be modified to utilize or incorporate any one or more aspects of the invention. Thus, in some cases, the treatment systems can involve connecting or configuring an existing facility to comprise an anoxic reactor, a biological reactor capable of promoting biosorption and biofilm growth, and an anaerobic digester. Accordingly, the foregoing description and drawings are by way of example only. Further, the depictions in the drawings do not limit the inventions to the particularly illustrated representations. For example, one or more biological reactors may be utilized in one or more trains of the treatment system.

Use of ordinal terms such as "first," "second," "third," and the like in the specification and claims to modify an element does not by itself connote any priority, precedence, or order of one element over another or the temporal order in which acts of a method are performed, but are used merely as labels to distinguish one element having a certain name from another element having a same name, but for use of the ordinal term, to distinguish the elements.

What is claimed is:

1. A method for treating wastewater comprising:
providing a wastewater to be treated;
denitrifying the wastewater in a first biological reactor to produce a denitrified mixed liquor;
nitrifying the denitrified mixed liquor with a nitrifying biofilm on a carrier and biosorbing undesirable constituents from the denitrified mixed liquor with a suspended biomass in a second biological reactor;
separating a first portion of the nitrified mixed liquor in a separator to produce a solids-rich sludge and a treated effluent having a total nitrogen concentration of less than about 10 milligrams of elemental nitrogen per liter; and
combining a second portion of the nitrified mixed liquor with the wastewater to be treated.

2. The method of claim 1, wherein a hydraulic retention time in the second biological reactor is less than about three hours.

3. The method of claim 2, further comprising treating at least a portion of the solids-rich sludge in a third biological reactor to produce a biologically treated sludge.

4. The method of claim 3, further comprising thickening the at least a portion of the solids-rich sludge to produce a thickened sludge and a sludge-lean portion, wherein treating the solids-rich sludge in the third biological comprises treating the thickened sludge to produce at least a portion of the biologically treated sludge.

5. The method of claim 3, further comprising combining a portion of the biologically treated sludge with at least one of the wastewater to be treated, the first biological reactor, and the second biological reactor at a predetermined flow rate.

6. The method of claim 5, wherein the portion of the biologically treated sludge combined with the at least one of the wastewater to be treated, the first biological reactor, and the second biological reactor is approximately 50% of the predetermined flow rate.

7. The method of claim 1, further comprising treating the wastewater to be treated in a clarifier located upstream of the first biological reactor.

8. The method of claim 1, wherein the treated effluent comprises an ammonia concentration of less than about five milligrams of elemental nitrogen per liter.

9. The method of claim 8, wherein the treated effluent comprises a chemical oxygen demand concentration of less than about 80 milligrams per liter.

10. A wastewater treatment system comprising:
a source of a wastewater to be treated;
a first biological reactor having an inlet fluidly connected downstream from the source of the wastewater;
a biological sorption tank comprising a biofilm carrier, and having an inlet fluidly connected to the first biological reactor, the biological sorption tank constructed and arranged to maintain an effluent having a total nitrogen concentration of less than about 10 milligrams elemental nitrogen per liter and a hydraulic retention time of less than about three hours;
a separator having a sludge outlet, an effluent outlet, and an inlet fluidly connected downstream of the biological sorption tank; and
a sludge recycle line fluidly connecting an outlet of the separator to the source of wastewater.

11. The wastewater treatment system of claim 10, further comprising an anaerobic digester having an anaerobically digested sludge outlet and an inlet fluidly connected to the sludge outlet.

12. The wastewater treatment system of claim 11, further comprising a sludge thickener having an inlet fluidly connected downstream from the sludge outlet of the separator, a thickened sludge outlet fluidly connected to the anaerobic digester, and a solids lean outlet.

13. The wastewater treatment system of claim 11, further comprising a mixed liquor recycle line fluidly connecting an outlet of the biological sorption tank to the source of wastewater.

14. The wastewater treatment system of claim 13, further comprising an anaerobically digested sludge recycle line fluidly connecting the anaerobically digested sludge outlet to the source of wastewater.

15. The wastewater treatment system of claim 10, further comprising a clarifier located upstream of the first biological reactor.

16. A method of facilitating wastewater treatment in a wastewater treatment system for reducing a concentration of a nitrogen containing compound from a wastewater, the system having a source of wastewater, an anoxic reactor, an aerobic reactor, a mixed liquor recycle stream fluidly connecting an outlet of the aerobic reactor to the anoxic reactor, a separator, and a sludge recycle stream fluidly connecting an outlet of the separator to the anoxic reactor, the method comprising:
introducing a biofilm carrier into the aerobic reactor; and
fluidly connecting a solids-rich outlet of the separator to an anaerobic digester.

17. The method of claim 16, further comprising fluidly connecting an outlet of the anaerobic digester to at least one of the source of wastewater, the anoxic reactor, the aerobic reactor, the mixed liquor recycle stream, and the sludge recycle stream.

18. The method of claim 17, further comprising fluidly connecting the solids-rich outlet of the separator to a sludge thickener, and fluidly connecting a thickened sludge outlet from the sludge thickener to the anaerobic digester.

19. A method for treating wastewater comprising:
providing a wastewater to be treated;
promoting denitrification of the wastewater in a first biological reactor to produce a first biologically treated mixed liquor;
promoting biological sorption of the first biologically treated mixed liquor and biofilm growth in a second biological reactor;
separating an effluent of the second biological reactor to produce a solids-rich sludge and a treated effluent having a total nitrogen concentration of less than about 10 milligrams of elemental nitrogen per liter; and
treating the solids-rich sludge in a third biological reactor to produce a biologically treated sludge.

20. The method of claim 19, wherein the hydraulic retention time in the second biological reactor is less than about three hours.

21. The method of claim 20, further comprising thickening the solids-rich sludge to produce a thickened sludge and a sludge-lean portion, wherein treating the solids-rich sludge in the third biological comprises treating the thickened sludge to produce at least a portion of the biologically treated sludge.

22. The method of claim 21, wherein promoting biological sorption of the first biologically treated mixed liquor and biofilm growth comprises introducing a biofilm carrier to the second biological reactor.

23. The method of claim 19, further comprising treating the wastewater to be treated in a clarifier located upstream of the first biological reactor.

24. The method of claim 19, further comprising introducing a portion of the biologically treated sludge to at least one of the wastewater to be treated, the first biological reactor, the second biological reactor, and the clarifier at a predetermined flow rate.

25. The method of claim 24, wherein the portion of the biologically treated sludge introduced to the to at least one of the wastewater to be treated, the first biological reactor, the second biological reactor, and the clarifier is approximately 50% of the predetermined flow rate.

26. The method of claim 19, wherein the treated effluent comprises an ammonia concentration of less than about five milligrams elemental nitrogen per liter.

27. The method of claim 26, wherein the treated effluent comprises a chemical oxygen demand concentration of less than 80 milligrams per liter.

* * * * *